US012284146B2

(12) United States Patent
Smith et al.

(10) Patent No.: US 12,284,146 B2
(45) Date of Patent: Apr. 22, 2025

(54) AUGMENTED REALITY AUTO REACTIONS

(71) Applicant: Snap Inc., Santa Monica, CA (US)

(72) Inventors: Brian Anthony Smith, Brentwood, NY (US); Yu Jiang Tham, Los Angeles, CA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/477,359

(22) Filed: Sep. 16, 2021

(65) Prior Publication Data
US 2022/0086111 A1 Mar. 17, 2022

Related U.S. Application Data

(60) Provisional application No. 62/706,901, filed on Sep. 16, 2020.

(51) Int. Cl.
*H04L 51/10* (2022.01)
*G06T 19/00* (2011.01)
*H04L 51/046* (2022.01)
*H04L 51/222* (2022.01)

(52) U.S. Cl.
CPC ............ *H04L 51/10* (2013.01); *G06T 19/006* (2013.01); *H04L 51/046* (2013.01); *H04L 51/222* (2022.05)

(58) Field of Classification Search
CPC ..... H04L 51/10; H04L 51/046; H04L 51/222; G06T 19/006
See application file for complete search history.

(56) References Cited

U.S. PATENT DOCUMENTS

| 5,604,843 | A | 2/1997 | Shaw et al. |
| 5,689,559 | A | 11/1997 | Park |
| 5,880,731 | A | 3/1999 | Liles et al. |
| 6,023,270 | A | 2/2000 | Brush, II et al. |
| RE36,919 | E | 10/2000 | Park |
| RE37,052 | E | 2/2001 | Park |
| 6,223,165 | B1 | 4/2001 | Lauffer |

(Continued)

FOREIGN PATENT DOCUMENTS

| CN | 103076875 | | 5/2013 |
| CN | 106126067 | A | 11/2016 |

(Continued)

OTHER PUBLICATIONS

U.S. Appl. No. 16/947,089, filed Jul. 17, 2020, On-Demand Camera Sharing Over a Network.

(Continued)

*Primary Examiner* — Jonathan A Bui
*Assistant Examiner* — Tania M Pena-Santana
(74) *Attorney, Agent, or Firm* — Schwegman Lundberg & Woessner, P.A.

(57) ABSTRACT

Systems and methods herein describe generating automatic reactions in an augmented reality messenger system. The claimed systems and methods generate a contextual trigger defining a set of conditions at a first computing device, detect at least one of the set of conditions has been satisfied, cause presentation of an augmented reality content item at a second computing device, generate a user reaction in response to the presentation of the augmented reality content item and transmit the user reaction to a first computing device.

20 Claims, 28 Drawing Sheets

(56) References Cited

U.S. PATENT DOCUMENTS

| | | |
|---|---|---|
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,264,529 B2 | 9/2012 | Goulart et al. |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,412,773 B1 | 4/2013 | Chapweske et al. |
| 8,425,322 B2 | 4/2013 | Gillo et al. |
| 8,451,994 B2 | 5/2013 | Abuan et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,520,072 B1 | 8/2013 | Slavin et al. |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,675,071 B1 | 3/2014 | Slavin et al. |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,810,657 B1 | 8/2014 | Slavin et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,090 B2 | 10/2014 | Abuan et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,937,661 B1 | 1/2015 | Slavin et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,148,702 B1 | 9/2015 | Ko et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,560,223 B2 | 1/2017 | Johnson et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,747,012 B1 | 8/2017 | Moczydlowski |
| 9,749,270 B2 | 8/2017 | Collet et al. |
| 9,792,714 B2 | 10/2017 | Li et al. |
| 9,830,567 B2 | 11/2017 | Weiss |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,296,722 B2 | 5/2019 | Rock |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,432,996 B2 | 10/2019 | Dacus et al. |
| 10,454,857 B1 | 10/2019 | Blackstock et al. |
| 10,475,106 B1 | 11/2019 | Tang et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,740,804 B2 | 8/2020 | Spivack et al. |
| 10,762,174 B2 | 9/2020 | Denton et al. |
| 10,805,248 B2 | 10/2020 | Luo et al. |
| 10,862,838 B1 | 12/2020 | Bodapati |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,897,564 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,132,703 B2 | 9/2021 | Koenig |
| 11,176,484 B1 | 11/2021 | Dorner |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |

(56) References Cited

U.S. PATENT DOCUMENTS

| | | |
|---|---|---|
| 11,249,614 B2 | 2/2022 | Brody |
| 11,249,714 B2 | 2/2022 | Spivack et al. |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,412,298 B1 | 8/2022 | Anzalone et al. |
| 11,611,608 B1 | 3/2023 | Smith et al. |
| 11,880,946 B2 | 1/2024 | Smith et al. |
| 12,154,230 B2 | 11/2024 | Smith et al. |
| 2002/0065728 A1 | 5/2002 | Ogasawara |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0118111 A1 | 5/2010 | Bouazizi |
| 2010/0162149 A1 | 6/2010 | Sheleheda et al. |
| 2010/0203968 A1 | 8/2010 | Gill et al. |
| 2010/0214398 A1 | 8/2010 | Goulart et al. |
| 2010/0227682 A1 | 9/2010 | Reville et al. |
| 2010/0313113 A1 | 12/2010 | Chen et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0249075 A1 | 10/2011 | Abuan et al. |
| 2011/0249077 A1 | 10/2011 | Abuan et al. |
| 2011/0249078 A1 | 10/2011 | Abuan et al. |
| 2011/0249086 A1 | 10/2011 | Guo et al. |
| 2012/0058801 A1 | 3/2012 | Nurmi |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0206335 A1 | 8/2012 | Osterhout et al. |
| 2013/0021373 A1 | 1/2013 | Vaught et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0265378 A1 | 10/2013 | Abuan et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0146084 A1* | 5/2014 | Polo ............... G06V 10/255 382/103 |
| 2014/0178029 A1 | 6/2014 | Raheman et al. |
| 2014/0225924 A1 | 8/2014 | Loxam et al. |
| 2014/0310595 A1 | 10/2014 | Acharya |
| 2014/0354532 A1 | 12/2014 | Mullins |
| 2015/0206349 A1 | 7/2015 | Rosenthal et al. |
| 2015/0254618 A1 | 9/2015 | Shivaram |
| 2015/0350136 A1* | 12/2015 | Flynn, III ........... G06F 3/04842 715/752 |
| 2016/0134840 A1 | 5/2016 | Mcculloch |
| 2016/0192166 A1 | 6/2016 | Decharms |
| 2016/0234149 A1 | 8/2016 | Tsuda et al. |
| 2017/0026672 A1 | 1/2017 | Dacus et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2017/0337742 A1 | 11/2017 | Powderly et al. |
| 2018/0005272 A1 | 1/2018 | Todasco et al. |
| 2018/0047200 A1 | 2/2018 | O'hara et al. |
| 2018/0089880 A1 | 3/2018 | Garrido et al. |
| 2018/0113587 A1 | 4/2018 | Allen et al. |
| 2018/0114372 A1 | 4/2018 | Nagy et al. |
| 2018/0115503 A1 | 4/2018 | Baldwin et al. |
| 2018/0167427 A1 | 6/2018 | Kedenburg, III |
| 2018/0198743 A1 | 7/2018 | Blackstock et al. |
| 2018/0268609 A1 | 9/2018 | Schneider et al. |
| 2018/0278994 A1 | 9/2018 | Holden et al. |
| 2018/0300916 A1 | 10/2018 | Barnett et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0322801 A1 | 11/2018 | Dey et al. |
| 2018/0345129 A1 | 12/2018 | Rathod |
| 2019/0001223 A1 | 1/2019 | Blackstock et al. |
| 2019/0036989 A1 | 1/2019 | Eirinberg et al. |
| 2019/0052925 A1 | 2/2019 | Mcdowell et al. |
| 2019/0057616 A1 | 2/2019 | Cohen et al. |
| 2019/0080342 A1 | 3/2019 | Andon et al. |
| 2019/0080344 A1 | 3/2019 | Faris et al. |
| 2019/0081947 A1 | 3/2019 | Faris et al. |
| 2019/0087842 A1 | 3/2019 | Koenig |
| 2019/0097958 A1 | 3/2019 | Collet et al. |
| 2019/0107990 A1 | 4/2019 | Spivack et al. |
| 2019/0107991 A1 | 4/2019 | Spivack et al. |
| 2019/0108558 A1 | 4/2019 | Spivack et al. |
| 2019/0108578 A1 | 4/2019 | Spivack et al. |
| 2019/0147481 A1 | 5/2019 | Shrivastava |
| 2019/0188920 A1 | 6/2019 | Mcphee et al. |
| 2019/0213619 A1 | 7/2019 | Andon et al. |
| 2019/0222806 A1 | 7/2019 | Soppelsa et al. |
| 2019/0251750 A1* | 8/2019 | Brewer ................. G06F 3/0304 |
| 2019/0279250 A1 | 9/2019 | Gordon et al. |
| 2019/0280997 A1 | 9/2019 | Baldwin et al. |
| 2019/0362554 A1 | 11/2019 | Chen et al. |
| 2019/0370556 A1 | 12/2019 | Kline et al. |
| 2019/0394533 A1 | 12/2019 | Chakraborty et al. |
| 2020/0019295 A1 | 1/2020 | Spivack et al. |
| 2020/0026922 A1 | 1/2020 | Pekelny et al. |
| 2020/0029113 A1 | 1/2020 | Dacus et al. |
| 2020/0066045 A1* | 2/2020 | Stahl ...................... G06T 19/20 |
| 2020/0226481 A1 | 7/2020 | Sim et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0074068 A1 | 3/2021 | Spivack et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0319514 A1 | 10/2021 | Jones |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |

(56) References Cited

U.S. PATENT DOCUMENTS

| | | | | |
|---|---|---|---|---|
| 2022/0067373 | A1* | 3/2022 | Stone | G06F 16/90335 |
| 2022/0076492 | A1 | 3/2022 | Smith et al. | |
| 2022/0084295 | A1 | 3/2022 | Smith et al. | |
| 2022/0172239 | A1 | 6/2022 | Smith et al. | |
| 2022/0237878 | A1 | 7/2022 | Tartz et al. | |
| 2023/0177775 | A1 | 6/2023 | Dudovitch et al. | |
| 2023/0188594 | A1 | 6/2023 | Smith et al. | |
| 2024/0364777 | A1 | 10/2024 | Smith et al. | |

FOREIGN PATENT DOCUMENTS

| | | | | |
|---|---|---|---|---|
| CN | 106663411 | A | 5/2017 | |
| CN | 108027738 | A | 5/2018 | |
| CN | 108141526 | A | 6/2018 | |
| CN | 109034167 | A | 12/2018 | |
| CN | 109212755 | A | 1/2019 | |
| CN | 109643166 | A | 4/2019 | |
| CN | 109863532 | A | 6/2019 | |
| CN | 110168478 | A | 8/2019 | |
| CN | 110199299 | A | 9/2019 | |
| CN | 111492330 | A | 8/2020 | |
| CN | 116076063 | | 5/2023 | |
| CN | 116134797 | | 5/2023 | |
| CN | 116171566 | | 5/2023 | |
| CN | 116584101 | | 8/2023 | |
| EP | 2184092 | A2 | 5/2010 | |
| JP | 2001230801 | A | 8/2001 | |
| JP | 2009032042 | | 2/2009 | |
| JP | 5497931 | B2 | 3/2014 | |
| JP | 2019177076 | | 10/2019 | |
| KR | 20140088459 | | 7/2014 | |
| KR | 101445263 | B1 | 9/2014 | |
| WO | WO-2003094072 | A1 | 11/2003 | |
| WO | WO-2004095308 | A1 | 11/2004 | |
| WO | WO-2006107182 | A1 | 10/2006 | |
| WO | WO-2007134402 | A1 | 11/2007 | |
| WO | WO-2012139276 | A1 | 10/2012 | |
| WO | WO-2013027893 | A1 | 2/2013 | |
| WO | WO-2013152454 | A1 | 10/2013 | |
| WO | WO-2013166588 | A1 | 11/2013 | |
| WO | WO-2014031899 | A1 | 2/2014 | |
| WO | WO-2014194439 | A1 | 12/2014 | |
| WO | WO-2016090605 | A1 | 6/2016 | |
| WO | WO-2017072534 | A2 * | 5/2017 | H04L 12/1822 |
| WO | WO-2018081013 | A1 | 5/2018 | |
| WO | WO-2018102562 | A1 | 6/2018 | |
| WO | WO-2018104834 | A1 | 6/2018 | |
| WO | WO-2018129531 | A1 | 7/2018 | |
| WO | WO-2018204879 | A1 | 11/2018 | |
| WO | WO-2019055703 | A2 * | 3/2019 | A63F 13/69 |
| WO | WO-2019079826 | A1 | 4/2019 | |
| WO | WO-2019089613 | A1 | 5/2019 | |
| WO | WO-2022056118 | A1 | 3/2022 | |
| WO | WO-2022060829 | A1 | 3/2022 | |
| WO | WO-2022061362 | A1 | 3/2022 | |
| WO | WO-2022115591 | A1 | 6/2022 | |

OTHER PUBLICATIONS

U.S. Appl. No. 17/480,513, filed Sep. 21, 2021, Reward-Based Real-Time Communication Session.
U.S. Appl. No. 17/470,546, filed Sep. 9, 2021, Augmented Reality Messenger System.
U.S. Appl. No. 17/476,085, filed Sep. 15, 2021, Context Triggered Augmented Reality.
"U.S. Appl. No. 16/947,089, Non Final Office Action mailed Feb. 17, 2022", 10 pgs.
"International Application Serial No. PCT/US2021/049653, International Search Report mailed Nov. 25, 2021", 5 pgs.
"International Application Serial No. PCT/US2021/049653, Written Opinion mailed Nov. 25, 2021", 5 pgs.
"International Application Serial No. PCT/US2021/050445, International Search Report mailed Dec. 1, 2021", 4 pgs.
"International Application Serial No. PCT/US2021/050445, Written Opinion mailed Dec. 1, 2021", 6 pgs.
"International Application Serial No. PCT/US2021/060803, International Search Report mailed Mar. 1, 2022", 4 pgs.
"International Application Serial No. PCT/US2021/060803, Written Opinion mailed Mar. 1, 2022", 5 pgs.
"International Application Serial No. PCT/US2021/071494, International Search Report mailed Nov. 30, 2021", 4 pgs.
"International Application Serial No. PCT/US2021/071494, Written Opinion mailed Nov. 30, 2021", 5 pgs.
"U.S. Appl. No. 16/947,089, Final Office Action mailed Jun. 10, 2022", 11 pgs.
"U.S. Appl. No. 16/947,089, Response filed May 17, 2022 to Non Final Office Action mailed Feb. 17, 2022", 9 pgs.
"U.S. Appl. No. 17/476,085, Non Final Office Action mailed Sep. 1, 2022", 22 pgs.
"U.S. Appl. No. 16/947,089, Notice of Allowance mailed Oct. 26, 2022", 9 pgs.
"U.S. Appl. No. 16/947,089, Notice of Allowance mailed Nov. 18, 2022", 8 pgs.
"U.S. Appl. No. 16/947,089, Response filed Oct. 10, 2022 to Final Office Action mailed Jun. 10, 2022", 9 pgs.
"U.S. Appl. No. 17/470,546, Non Final Office Action mailed Sep. 29, 2022", 21 pgs.
"U.S. Appl. No. 17/480,513, Non-Final Office Action mailed Oct. 25, 2022", 21 pgs.
Heredia, E. A, "5-Smart Home Networking for Content Management", Ecological Design of Smart Home Networks, (2015), 67-85.
Johnson, Mark R, et al., "And Today's Top Donator is: How Live Streamers on Twitch.tv Monetize and Gamify Their Broadcasts", Social Media + Society, 5(4), https://doi.org/10.1177/2056305119881694, (2019), 11 pgs.
"International Application Serial No. PCT/US2021/060803, International Preliminary Report on Patentability mailed Jun. 15, 2023", 7 pgs.
"U.S. Appl. No. 17/480,513, Response filed Jul. 11, 2023 to Final Office Action mailed Apr. 12, 2023", 18 pgs.
"U.S. Appl. No. 17/476,085, Notice of Allowance mailed Jul. 17, 2023", 10 pgs.
"U.S. Appl. No. 17/470,546, Response filed Aug. 11, 2023 to Final Office Action mailed May 11, 2023", 12 pgs.
"U.S. Appl. No. 17/480,513, Non Final Office Action mailed Sep. 7, 2023", 31 pgs.
"U.S. Appl. No. 17/470,546, Non Final Office Action mailed Sep. 14, 2023", 29 pgs.
"U.S. Appl. No. 18/166,687, Non Final Office Action mailed Oct. 11, 2023", 15 pgs.
"U.S. Appl. No. 17/480,513, Response filed Jan. 25, 2023 to Non Final Office Action mailed Oct. 25, 2022", 14 pgs.
"U.S. Appl. No. 17/470,546, Response filed Jan. 30, 2023 to Non Final Office Action mailed Sep. 29, 2022", 11 pgs.
"U.S. Appl. No. 17/476,085, Response filed Feb. 2, 2023 to Non Final Office Action mailed Sep. 1, 2022", 11 pgs.
"U.S. Appl. No. 17/476,085, Final Office Action mailed Feb. 17, 2023", 27 pgs.
"International Application Serial No. PCT US2021 049653, International Preliminary Report on Patentability mailed Mar. 23, 2023", 7 pgs.
"International Application Serial No. PCT US2021 050445, International Preliminary Report on Patentability mailed Mar. 30, 2023", 8 pgs.
"International Application Serial No. PCT US2021 071494, International Preliminary Report on Patentability mailed Mar. 30, 2023", 7 pgs.
"U.S. Appl. No. 17/480,513, Final Office Action mailed Apr. 12, 2023", 31 pgs.
"U.S. Appl. No. 17/470,546, Final Office Action mailed May 11, 2023", 29 pgs.
"U.S. Appl. No. 17/476,085, Response filed May 17, 2023 to Final Office Action mailed Feb. 17, 2023", 12 pgs.
"U.S. Appl. No. 17/470,546, Examiner Interview Summary mailed Mar. 6, 2024", 2 pgs.

(56) References Cited

OTHER PUBLICATIONS

"U.S. Appl. No. 17/470,546, Notice of Allowance mailed Apr. 4, 2024", 10 pgs.
"U.S. Appl. No. 17/470,546, Response filed Mar. 14, 2024 to Non Final Office Action mailed Sep. 14, 2023", 11 pgs.
"U.S. Appl. No. 17/476,085, Corrected Notice of Allowability mailed Oct. 26, 2023", 5 pgs.
"U.S. Appl. No. 17/476,085, Corrected Notice of Allowability mailed Dec. 21, 2023", 2 pgs.
"U.S. Appl. No. 17/480,513, Final Office Action mailed Feb. 8, 2024", 41 pgs.
"U.S. Appl. No. 17/480,513, Response filed Dec. 5, 2023 to Non Final Office Action mailed Sep. 7, 2023", 17 pgs.
"U.S. Appl. No. 18/166,687, Advisory Action mailed Apr. 18, 2024", 3 pgs.
"U.S. Appl. No. 18/166,687, Final Office Action mailed Feb. 14, 2024", 11 pgs.
"U.S. Appl. No. 18/166,687, Response filed Jan. 11, 2024 to Non Final Office Action mailed Oct. 11, 2023", 11 pgs.
"U.S. Appl. No. 18/166,687, Response filed Apr. 5, 2024 to Final Office Action mailed Feb. 14, 2024", 12 pgs.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.
"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"Chinese Application Serial No. 202180054782.5, Office Action mailed Mar. 18, 2024", w/ English translation, 18 pgs.
"Chinese Application Serial No. 202180062923.8, Office Action mailed Mar. 20, 2024", w/ English translation, 21 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.
MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.
"U.S. Appl. No. 17/470,546, Notice of Allowance mailed Jul. 19, 2024", 10 pgs.
"U.S. Appl. No. 17/480,513, Examiner Interview Summary mailed May 3, 2024", 3 pgs.
"U.S. Appl. No. 17/480,513, Non Final Office Action mailed Jul. 16, 2024", 14 pgs.
"U.S. Appl. No. 17/480,513, Response filed May 8, 2024 to Final Office Action mailed Feb. 8, 2024", 20 pgs.
"U.S. Appl. No. 18/166,687, Corrected Notice of Allowability mailed May 29, 2024", 2 pgs.
"U.S. Appl. No. 18/166,687, Notice of Allowance mailed May 17, 2024", 10 pgs.
"Chinese Application Serial No. 202180054782.5, Response filed Jul. 18, 2024 to Office Action mailed Mar. 18, 2024", w/ English Claims, 13 pgs.
"Chinese Application Serial No. 202180062937.X, Office Action mailed Jul. 16, 2024", w/ English Translation, 17 pgs.
"Chinese Application Serial No. 202180054782.5, Response filed Sep. 30, 2024 to Office Action mailed Aug. 2, 2024", w/ current English claims, 15 pgs.
"U.S. Appl. No. 17/480,513, Response filed Oct. 14, 2024 to Non Final Office Action mailed Jul. 16, 2024", 13 pgs.
"U.S. Appl. No. 17/470,546, Supplemental Notice of Allowability mailed Oct. 22, 2024", 3 pgs.
"U.S. Appl. No. 17/480,513, Final Office Action mailed Nov. 20, 2024", 10 pgs.
"Chinese Application Serial No. 202180062937.X, Response filed Nov. 18, 2024 to Office Action mailed Jul. 16, 2024", w/ English Claims, 15 pgs.
"Chinese Application Serial No. 202180062923.8, Response filed Nov. 26, 2024 to Office Action mailed Sep. 26, 2024", w/ English Claims, 15 pgs.
"Chinese Application Serial No. 202180062923.8, Office Action mailed Sep. 26, 2024", w/ English Translation, 24 pgs.
"Chinese Application Serial No. 202180054782.5, Decision of Rejection mailed Oct. 22, 2024", w/ English Translation, 15 pgs.
"Korean Application Serial No. 10-2023-7021691, Notice of Preliminary Rejection mailed Nov. 21, 2024", w/ English translation, 11 pgs.
"European Application Serial No. 21787130.0, Communication Pursuant to Article 94(3) EPC mailed Dec. 17, 2024", 5 pgs.
"European Application Serial No. 21787285.2, Communication Pursuant to Article 94(3) EPC mailed Jan. 24, 2025", 6 pgs.
"European Application Serial No. 21794676.3, Communication Pursuant to Article 94(3) EPC mailed Jan. 27, 2025", 6 pgs.
Liang, Tian, "Key Technology Research of Augmented Reality Based on Deep Learning", Full-text Database of China's Outstanding Master's Degree Theses (Electronic Journals) Information Technology Series, w/ English abstract, (Jul. 15, 2020), 106 pgs.
Schütt, Peer, et al., "Semantic Interaction in Augmented Reality Environments for Microsoft HoloLens", 2019 European Conference on Mobile Robots (ECMR), (Oct. 17, 2019), 6 pgs.
"U.S. Appl. No. 17/480,513, Advisory Action mailed Jan. 24, 2025", 3 pgs.

(56) References Cited

OTHER PUBLICATIONS

"U.S. Appl. No. 17/480,513, Response filed Feb. 18, 2025 to Advisory Action mailed Jan. 24, 2025", 12 pgs.
"U.S. Appl. No. 17/480,513, Response filed Dec. 30, 24 to Final Office Action mailed Nov. 2020, 24", 11 pgs.
"Chinese Application Serial No. 202180054782.5, Request for Reexamination filed Jan. 21, 2025", W/English Claims, 14 pgs.
U.S. Appl. No. 19/042,189, filed Jan. 31, 2025.

* cited by examiner

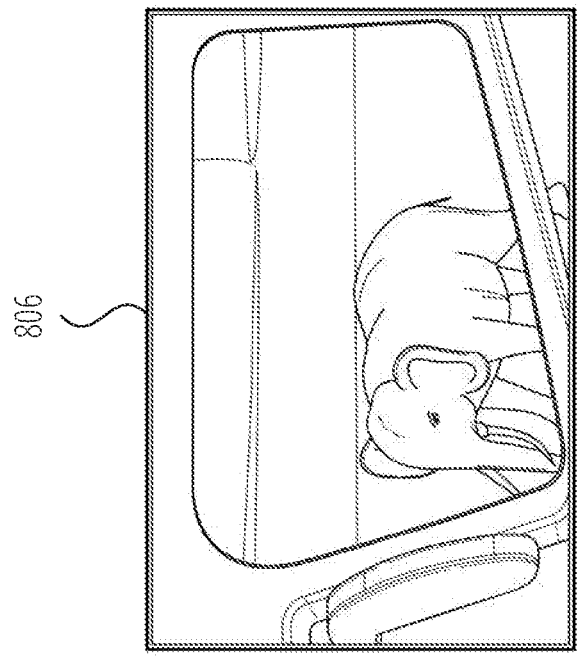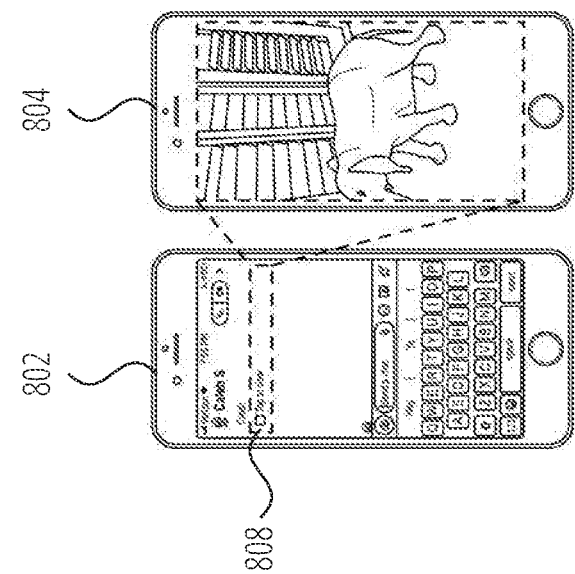
FIG. 8

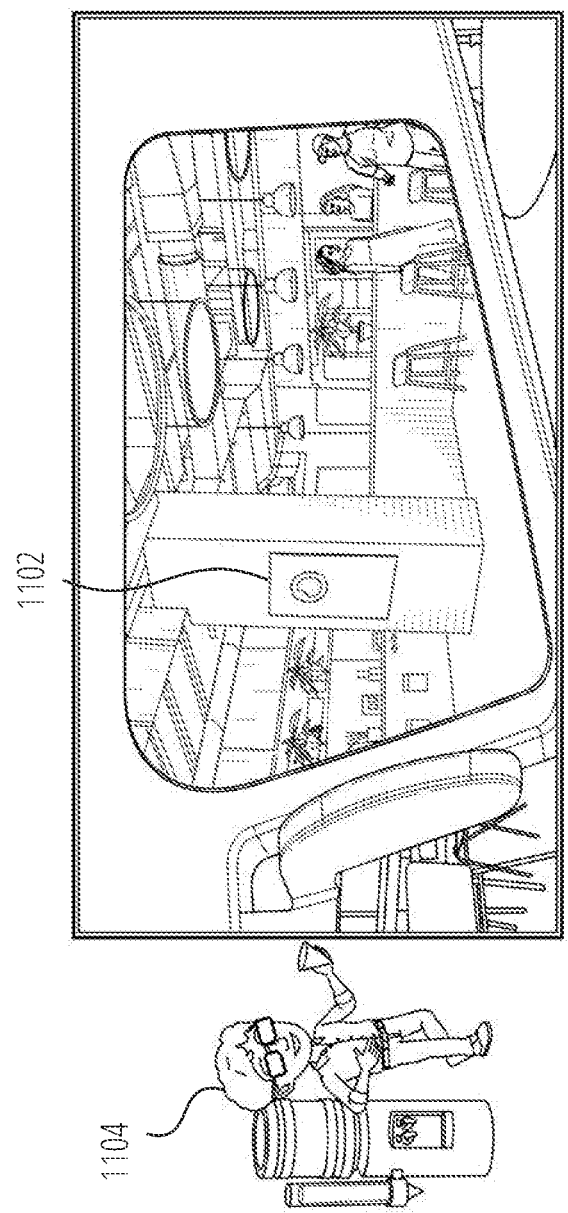

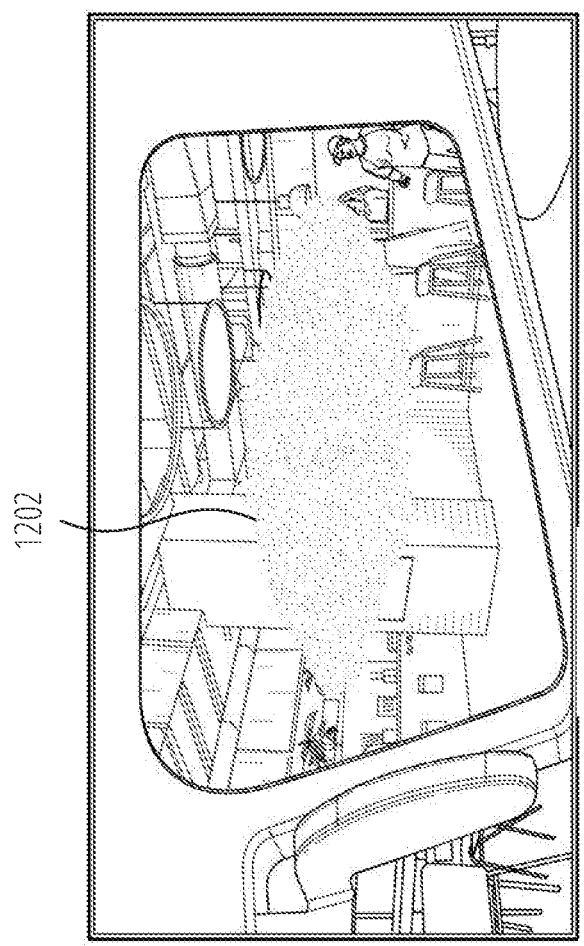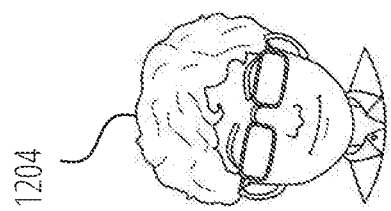
FIG. 12

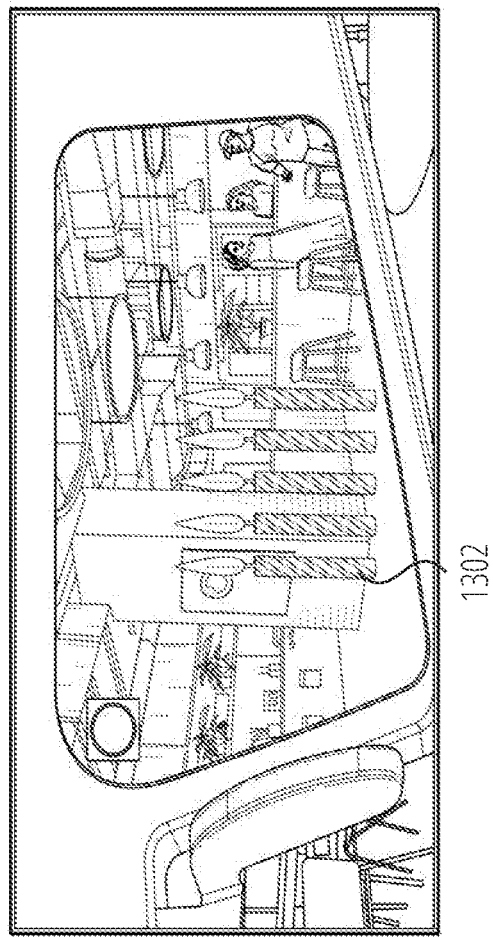
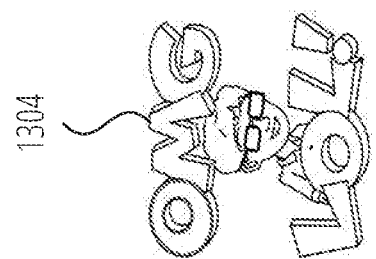
FIG. 13

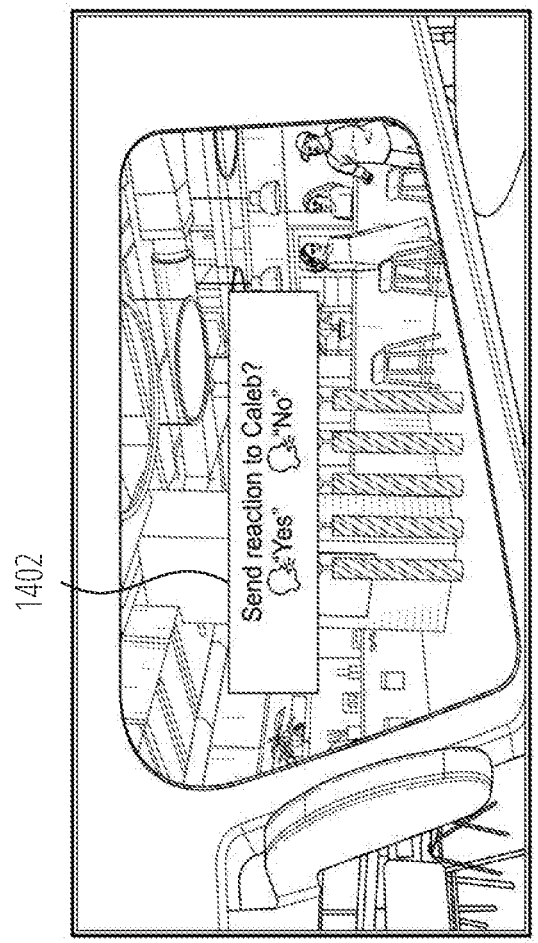
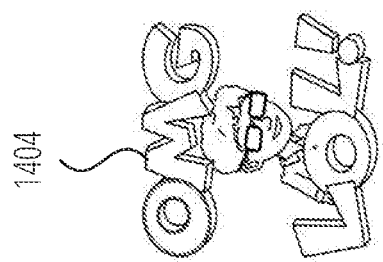
FIG. 14

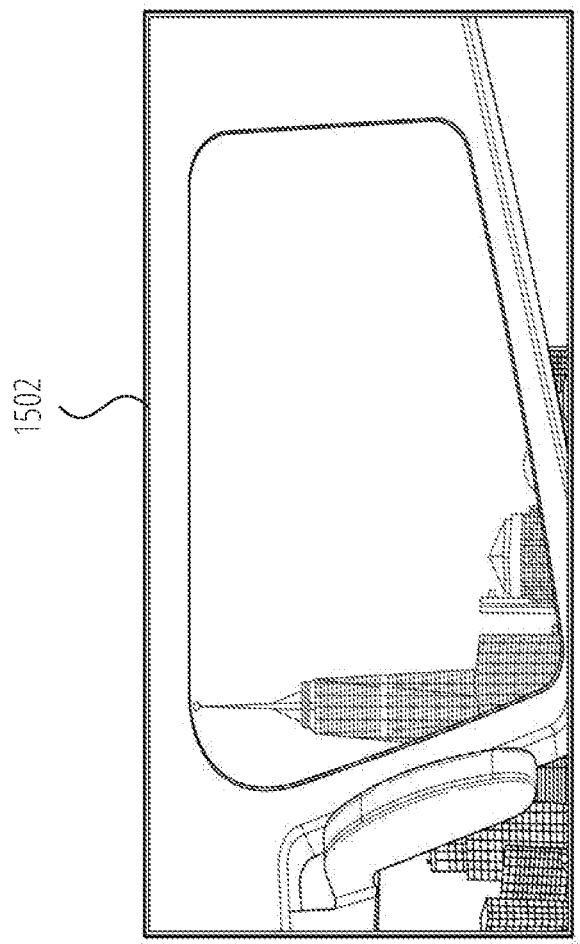
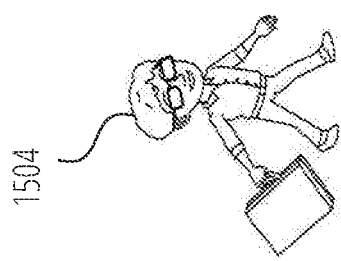
FIG. 15

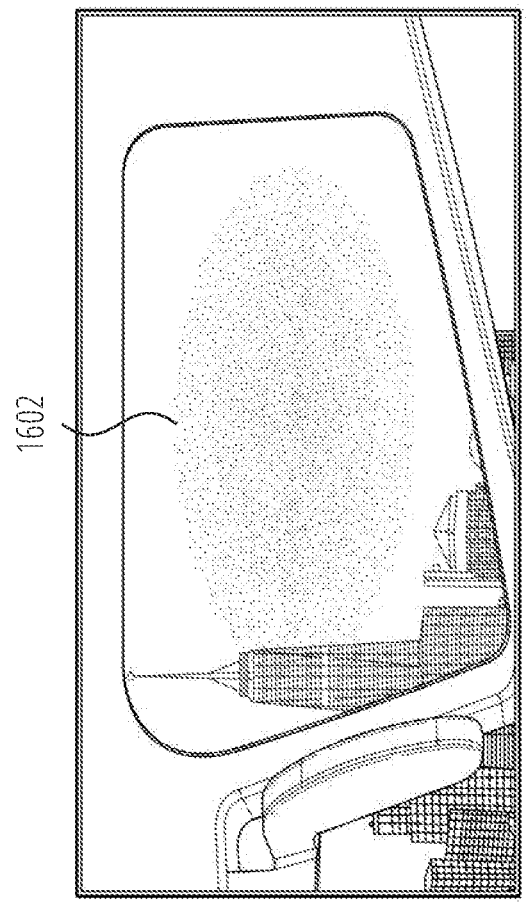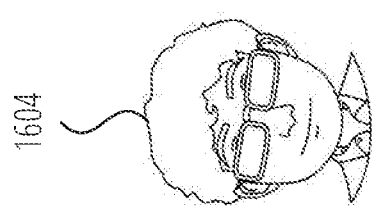
FIG. 16

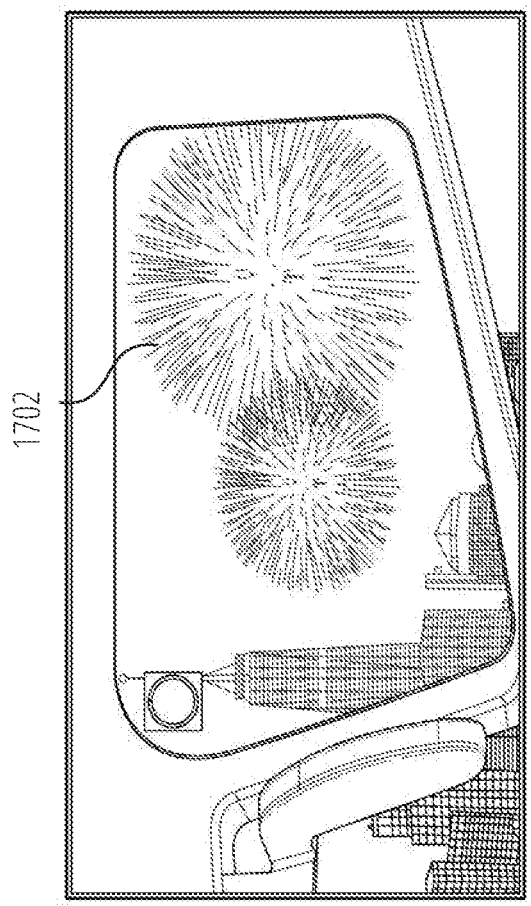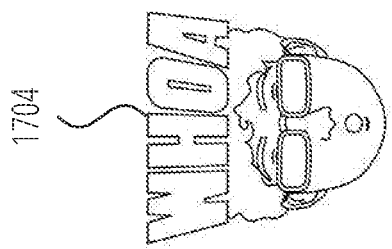
FIG. 17

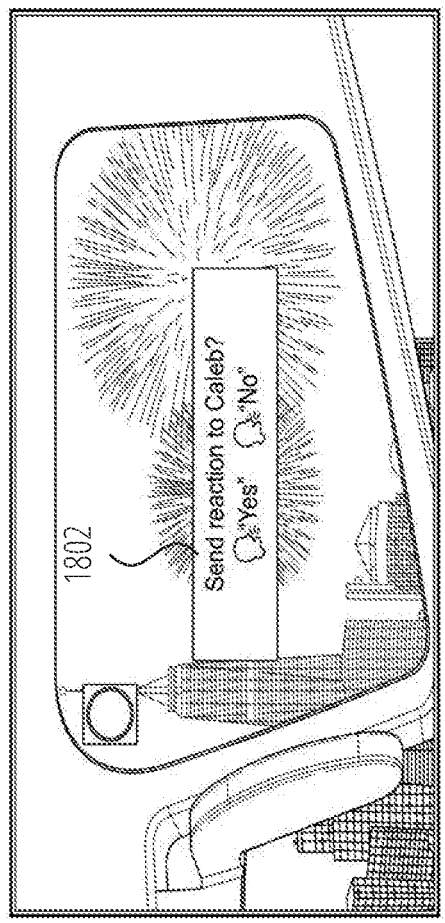
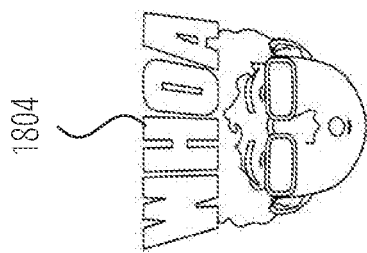
FIG. 18

AUGMENTED REALITY AUTO REACTIONS

CLAIM OF PRIORITY

This application claims the benefit of priority to U.S. Provisional Application Ser. No. 62/706,901, filed Sep. 16, 2020, which is incorporated herein by reference in its entirety.

TECHNICAL FIELD

Embodiments of the present disclosure relate generally to asynchronous communication systems. More specifically, but not by way of limitations, systems and methods herein describe auto-reactions in an asynchronous augmented reality messaging system.

BACKGROUND

Synchronous communication platforms allow people to communicate efficiently in real-time. Users can convey relevant, real-time information to one another while being online at the same time. On the other hand, asynchronous communication platforms allow users to communicate regardless of whether they are both online at the same time.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 8 is an illustration of an augmented reality message, according to some example embodiments.

FIG. 11 illustrates a visual marker trigger-based AR message, according to some example embodiments.

FIG. 12 illustrates a visual marker trigger-based AR message, according to some example embodiments.

FIG. 13 illustrates a visual marker trigger-based AR message, according to some example embodiments.

FIG. 14 illustrates a visual marker trigger-based AR message, according to some example embodiments.

FIG. 15 illustrates a time period trigger and location trigger-based AR message, according to some example embodiments FIG. 16 illustrates a time period trigger and location trigger-based AR message, according to some example embodiments.

FIG. 17 illustrates a time period trigger and location trigger-based AR message, according to some example embodiments FIG. 18 illustrates a time period trigger and location trigger-based AR message, according to some example embodiments.

DETAILED DESCRIPTION

Figure 1:
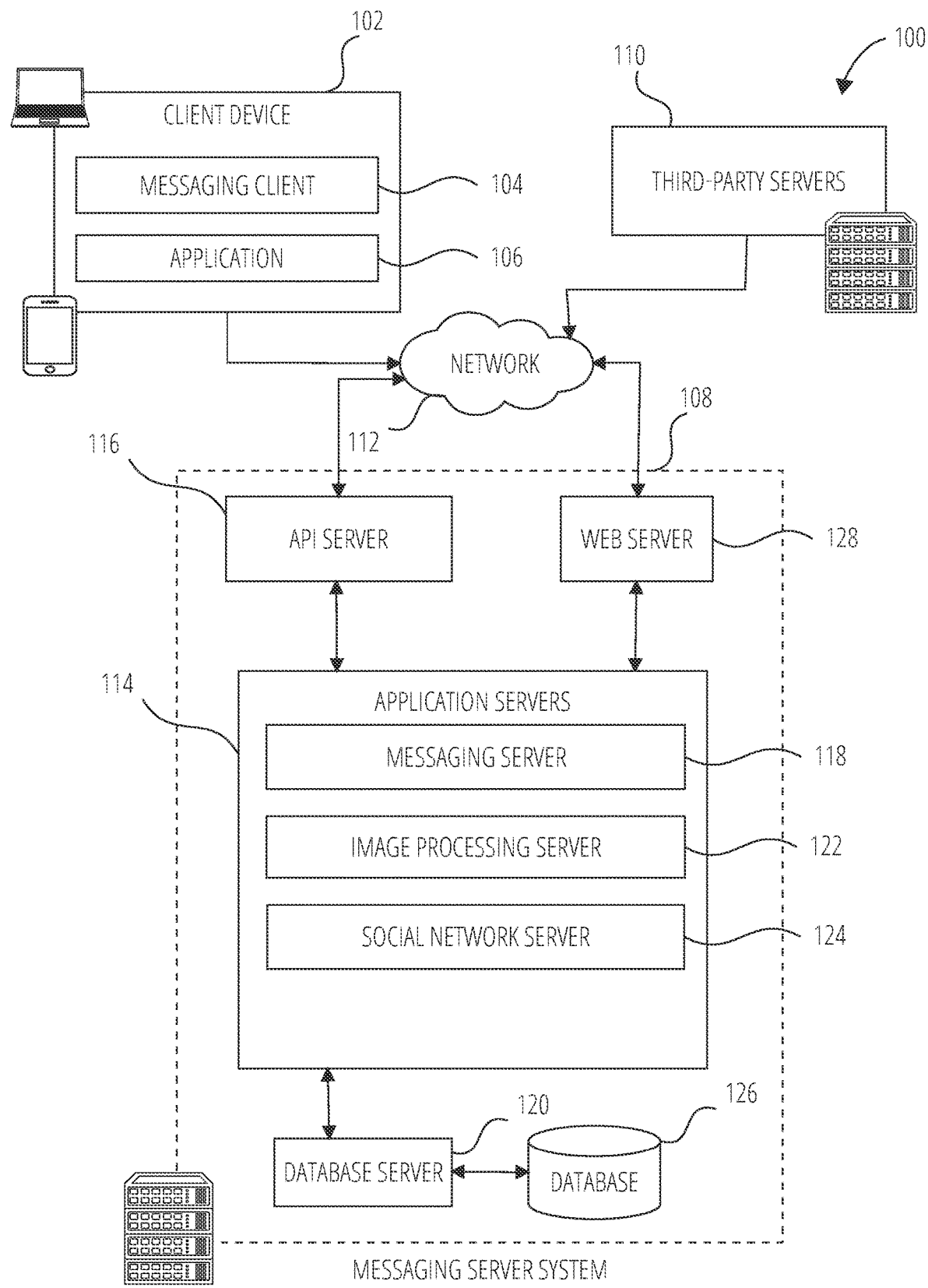
FIG. 1 is a diagrammatic representation of a networked environment in which the present disclosure may be deployed, in accordance with some examples.

An augmented reality messenger system allows users to send augmented reality (AR) messages to friends on a messaging platform. An AR message includes AR content bundled together with an audio message (e.g., a voice recorded message). The AR message can be delivered immediately or pre-scheduled for particular moments defined by time, location, or an object. The AR messenger system allows smartphone users to send AR messages. In some examples, the AR messenger system sends AR messages to friends wearing AR glasses. The AR messenger system overlays the AR messages onto the AR glasses wearer's view and captures the wearer's reaction to the AR message. The AR messenger system further allows the wearer to share their reaction back to the sender. Although the following paragraphs describe sending the AR message to a user wearing AR glasses, it is understood that the AR message may be displayed on any other suitable computing device, such as a smartphone.

The AR messenger system thus allows for synchronous or asynchronous communication. The AR message may be sent instantly, or pre-scheduled. For example, a sender can schedule an AR message using a set of pre-defined conditions that once triggered, will allow the AR message to be overlaid onto the receiver's view (e.g., the AR glasses wearer). The set of pre-defined conditions include but are not limited to, a location trigger, a time period trigger and a visual marker trigger.

The location trigger can be a physical address on a map, for example. In some examples the location trigger can be geographical coordinates (e.g., latitude and longitude), a general city (e.g., San Francisco), or an intersection of two streets. Once the AR glasses wearer is at the physical address or within a predefined threshold of the physical address, the AR message will be triggered. The time period trigger can be a time frame during which the AR message will be triggered. For example, a time frame may be 9:00 AM to 10:30 AM. The time frame can be associated with the time zone of the AR glasses wearer (e.g., the receiver of the AR message). In another example the time period trigger could be a specific time (e.g., 12:00 PM). The visual marker trigger can be an object that appears in the field of view of the AR glasses wearer. For example, the visual marker trigger may be a specific logo at the AR glasses wearer's workplace. Once the specific logo appears in the AR glasses wearer's field of view, the visual marker trigger condition is satisfied and the AR message is overlaid onto the AR glasses wearer's field of view. In some examples the visual marker trigger may be a specific color or texture.

The AR messenger system allows the AR glasses wearer to record a reaction to the AR message once the AR message is overlaid onto the AR glasses wearer's field of view. For example, the AR glasses wearer can record an audio message of the wearer reacting in real-time to the AR message being overlaid onto their field of view. The AR glasses wearer has the option to send the reaction back to the AR message sender. In some examples, the reaction along with the AR message overlaid onto the AR glasses wearer's field of view are sent back to the AR message sender.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data). The messaging client 104 further can generate and transmit context-based AR messages between multiple client devices 102.

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
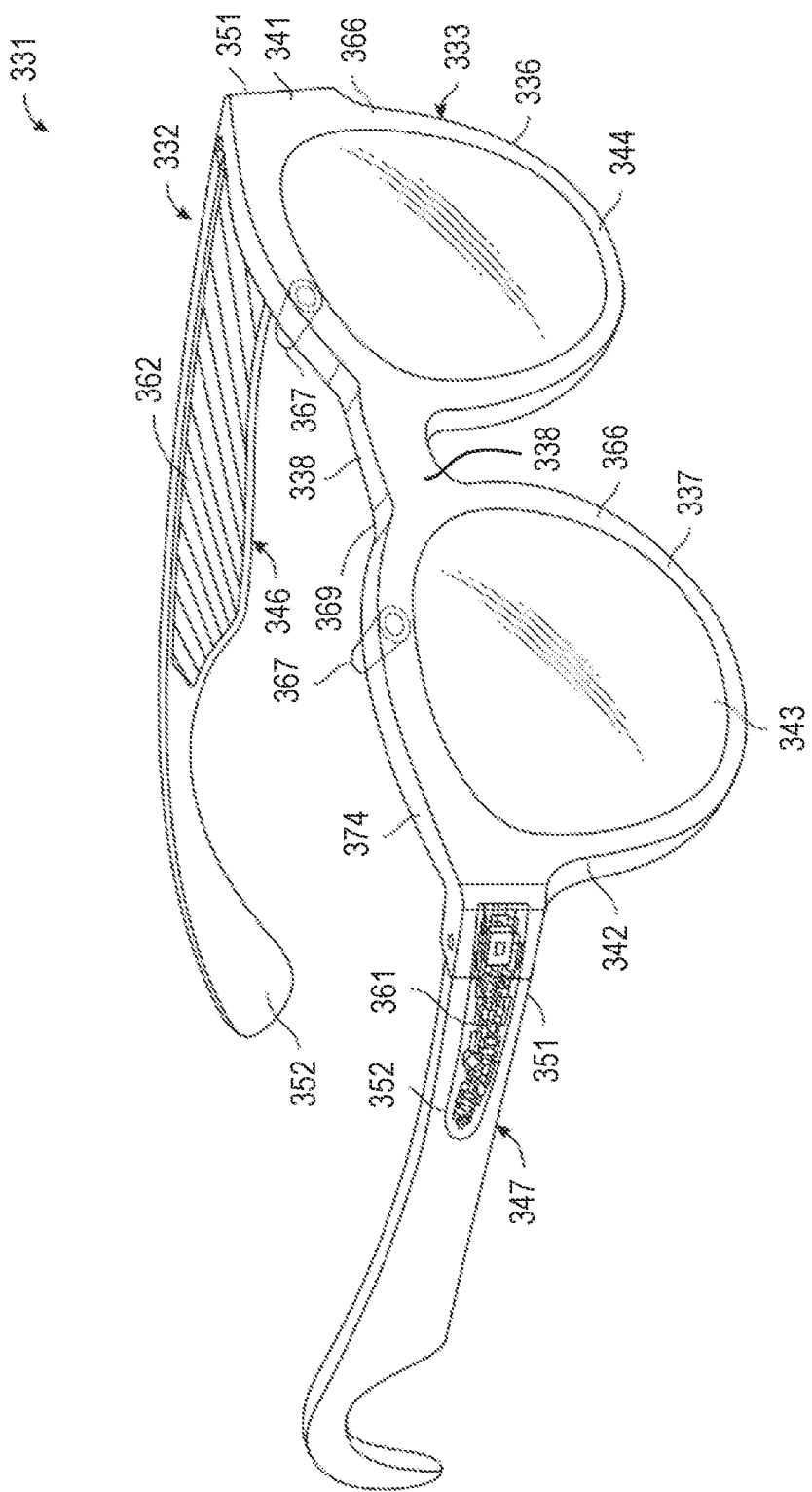
FIG. 3 is a diagram illustrating a wearable device in the example form of glasses for use in context-based augmented reality communication, according to some example embodiments.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
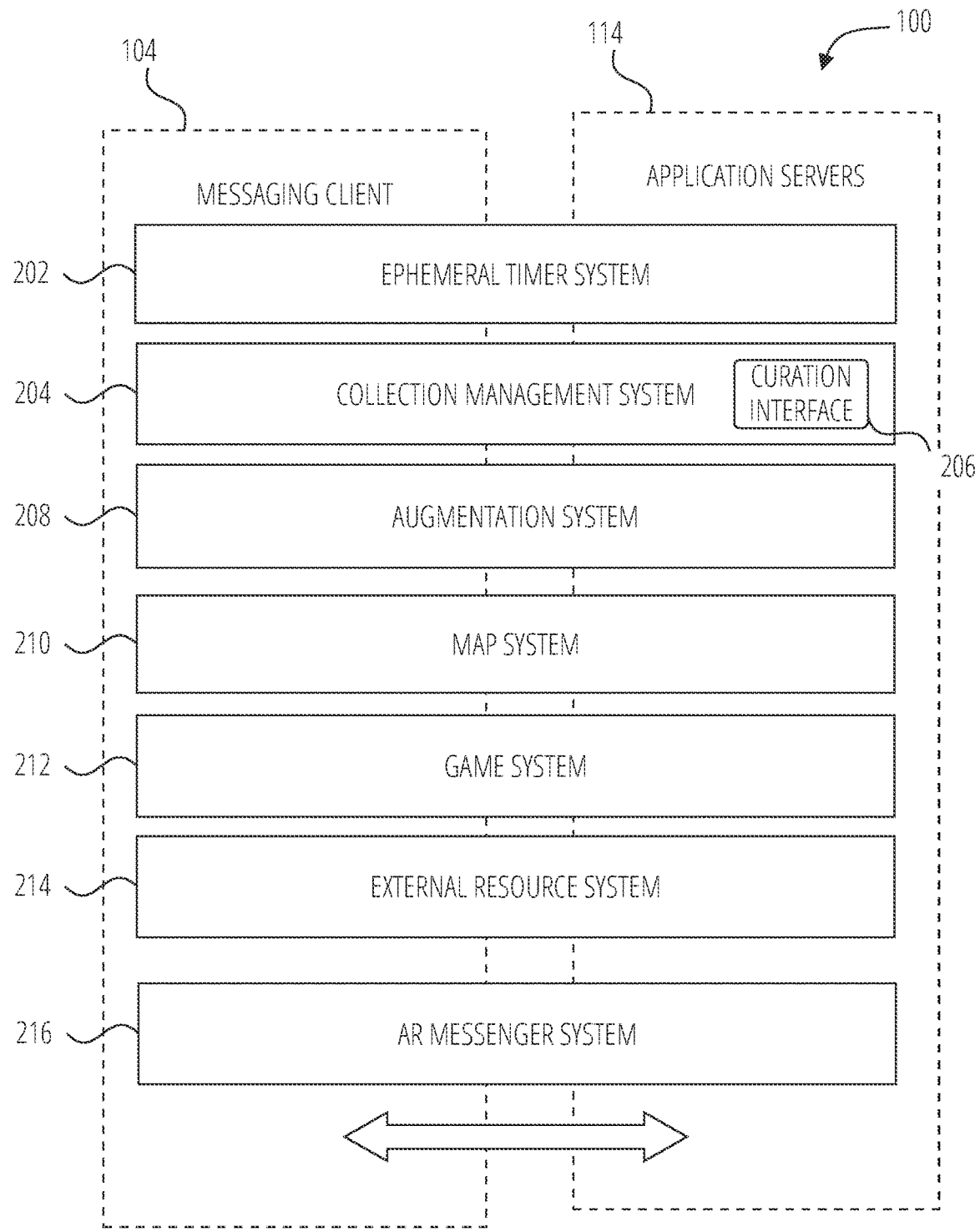
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and an AR Messenger System 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

The AR Messenger System 216 sends AR messages from a first computing device to a second computing device. The AR message can be delivered immediately or pre-scheduled for particular moments defined by a location trigger, time period trigger, or a visual marker trigger. The AR Messenger System 216 allows smartphone users to send AR messages. In some examples, the AR Messenger System 216 sends AR messages to friends wearing AR glasses. The AR Messenger System 216 overlays the AR messages onto the AR glasses wearer's view and captures the wearer's reaction to the AR message. The AR Messenger System 216 further allows the wearer to share their reaction back to the sender. In some examples, the AR Messenger System 216 sends messages to another smartphone or any suitable computing device. Some aspects of the AR Messenger System 216 may operate on the messaging client. Some aspects of the AR Messenger System 216 may operate on the application servers 114.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

FIG. 3 is a diagram illustrating a wearable device in the example form of glasses 331 for use in context-based augmented reality communication, according to some example embodiments. The glasses 331 can include a frame 332 made from any suitable material such as plastic or metal, including any suitable shape memory alloy. The frame 332 can have a front piece 333 that can include a first or left lens, display, or optical element holder 336 and a second or right lens, display, or optical element holder 337 connected by a bridge 338. The front piece 333 additionally includes a left end portion 341 and a right end portion 342. A first or left optical element 344 and a second or right optical element 343 can be provided within respective left and right optical element holders 336, 337. Each of the optical elements 343, 344 can be a lens, a display (e.g., a transparent display), a display assembly, or a combination of the foregoing. In some embodiments, for example, the glasses 331 are provided with an integrated near-eye display mechanism that enables, for example, display to the user of preview images for visual media captured by cameras 367 of the glasses 331. In some embodiments, integrated near-eye display mechanism allows for display of a augmented reality content item such that the augmented reality content item is overlaid on a real-world environment that is viewable through the optical elements 343 and 344.

The frame 332 additionally includes a left arm or temple piece 346 and a right arm or temple piece 347 coupled to the respective left and right end portions 341, 342 of the front piece 333 by any suitable means, such as a hinge (not shown), so as to be coupled to the front piece 333, or rigidly or fixably secured to the front piece 333 so as to be integral with the front piece 333. Each of the temple pieces 346 and 347 can include a first portion 351 that is coupled to the respective end portion 341 or 342 of the front piece 333 and any suitable second portion 352, such as a curved or arcuate piece, for coupling to the ear of the user. In one embodiment, the front piece 333 can be formed from a single piece of material, so as to have a unitary or integral construction. In one embodiment, the entire frame 332 can be formed from a single piece of material so as to have a unitary or integral construction.

The glasses 331 can include a device, such as a computer 361, which can be of any suitable type so as to be carried by the frame 332 and, in one embodiment, of a suitable size and shape so as to be at least partially disposed in one of the temple pieces 346 and 347. In one embodiment, the computer 361 has a size and shape similar to the size and shape of one of the temple pieces 346, 347 and is thus disposed almost entirely if not entirely within the structure and confines of such temple pieces 346 and 347. In one embodiment, the computer 361 can be disposed in both of the temple pieces 346, 347. The computer 361 can include one or more processors with memory, wireless communication circuitry, and a power source. The computer 361 comprises low-power circuitry, high-speed circuitry, and a display processor. Various other embodiments may include these elements in different configurations or integrated together in different ways.

The computer 361 additionally includes a battery 362 or other suitable portable power supply. In one embodiment, the battery 362 is disposed in one of the temple pieces 346 or 347. In the glasses 331 shown in FIG. 3, the battery 362 is shown as being disposed in the left temple piece 346 and electrically coupled using a connection 374 to the remainder of the computer 361 disposed in the right temple piece 347. One or more I/O devices can include a connector or port (not shown) suitable for charging a battery 362 accessible from the outside of the frame 332, a wireless receiver, transmitter, or transceiver (not shown), or a combination of such devices. Given the limited size of the glasses 331 and the computer 361, resource-intensive operations such as video streaming can quickly drain the battery 362 and can be a strain on the one or more processors of the computer 361 that can lead to overheating.

The glasses 331 include digital cameras 367. Although two cameras 367 are depicted, other embodiments contemplate the use of a single or additional (i.e., more than two) cameras. For ease of description, various features relating to the cameras 367 will further be described with reference to only a single camera 367, but it will be appreciated that these features can apply, in suitable embodiments, to both cameras 367.

Consistent with some embodiments, the glasses 331 are an example instance of the client device 102 and may be worn by the user 103-1. Further, in these embodiments, the user 103-2 can view a live camera feed generated by the camera 367 and interact with the user 103-2 by causing virtual enhancements added to a real-world environment that is visible to the user 103-1 via the glasses 331. That is, one or more augmented reality content items corresponding to a virtual enhancement selected by the user 103-2 can be displayed by the integrated near-eye display mechanism that enables such that the augmented reality content item is overlaid on a real-world environment that is viewable through the optical elements 343 and 344.

In various embodiments, the glasses 331 may include any number of input sensors or peripheral devices in addition to the cameras 367. The front piece 333 is provided with an outward-facing, forward-facing, front, or outer surface 366 that faces forward or away from the user when the glasses 331 are mounted on the face of the user, and an opposite inward-facing, rearward-facing, rear, or inner surface 369 that faces the face of the user (e.g., user 103-1) when the glasses 331 are mounted on the face of the user. Such sensors can include inward-facing video sensors or digital imaging modules such as cameras that can be mounted on or provided within the inner surface 369 of the front piece 333 or elsewhere on the frame 332 so as to be facing the user, and outward-facing video sensors or digital imaging modules such as the cameras 367 that can be mounted on or provided with the outer surface 366 of the front piece 333 or elsewhere on the frame 332 so as to be facing away from the user. Such sensors, peripheral devices, or peripherals can additionally include biometric sensors, location sensors, accelerometers, or any other such sensors.

The glasses 331 further include an example embodiment of a camera control mechanism or user input mechanism comprising a camera control button mounted on the frame 332 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 332 adjacent to its surface for detecting the presence of a user's finger to dispose the touch-sensitive button to the engaged condition when the user touches a finger to the corresponding spot on the outer surface of the frame 332. It will be appreciated that the above-described camera control button and capacitive touch button are but two examples of a haptic input mechanism for single-action control of the camera 367 and that other embodiments may employ different single-action haptic control arrangements.

Data Architecture

Figure 4:
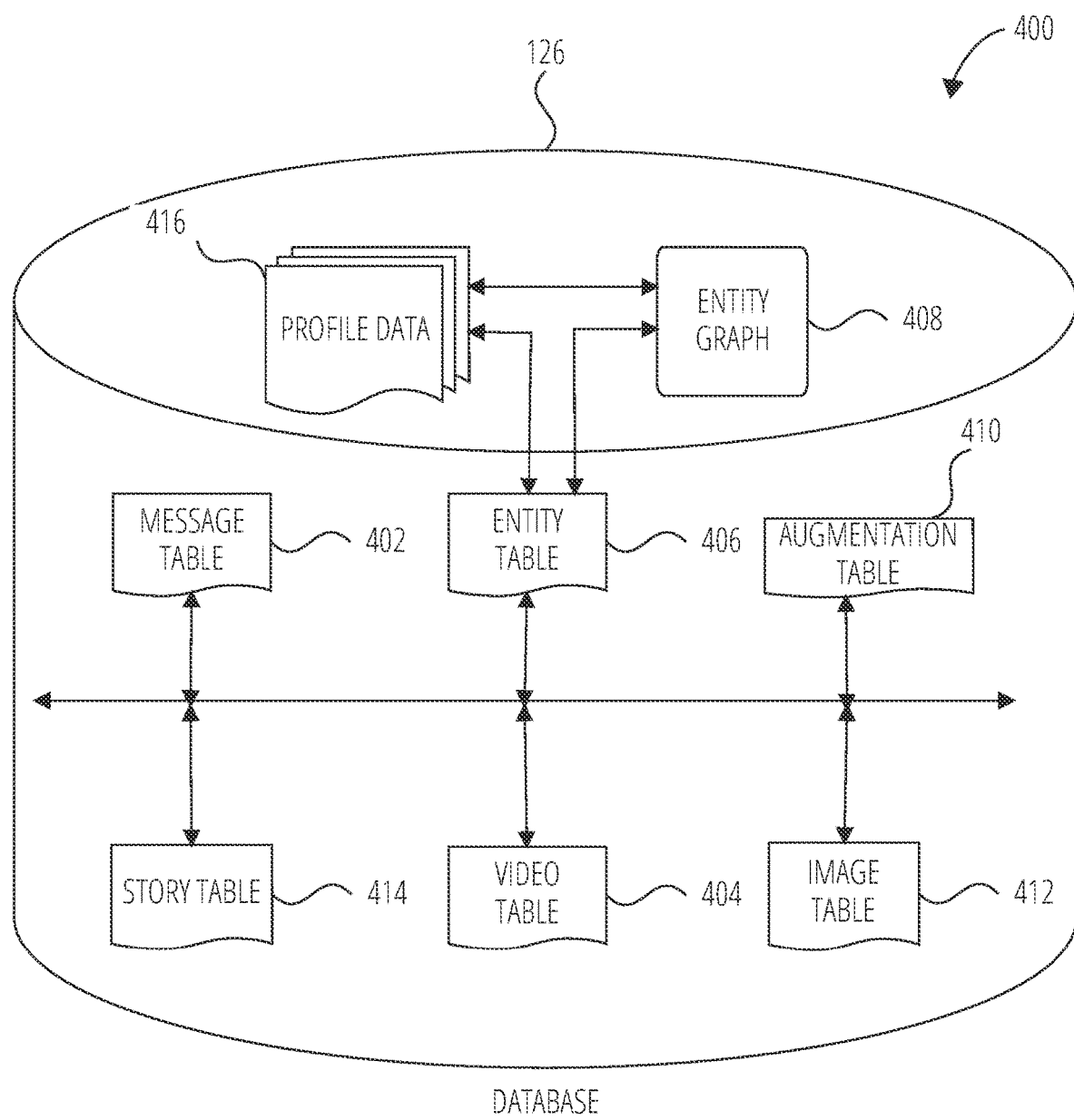
FIG. 4 is a diagrammatic representation of a data structure as maintained in a database, in accordance with some examples.

FIG. 4 is a schematic diagram illustrating data structures 400, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 402. This message data includes, for any particular one message, at least message sender data, message recipient (or receiver) data, and a payload. Further details regarding information that may be included in a message, and included within the message data stored in the message table 402 is described below with reference to FIG. 5.

An entity table 406 stores entity data, and is linked (e.g., referentially) to an entity graph 408 and profile data 416. Entities for which records are maintained within the entity table 406 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 408 stores information regarding relationships and associations between entities. Such relationships may be social, professional (e.g., work at a common corporation or organization) interested-based or activity-based, merely for example.

The profile data 416 stores multiple types of profile data about a particular entity. The profile data 416 may be selectively used and presented to other users of the messaging system 100, based on privacy settings specified by a particular entity. Where the entity is an individual, the profile data 416 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 416 for the group may similarly include one or more avatar representations associated with the group, in addition to the group name, members, and various settings (e.g., notifications) for the relevant group.

The database 126 also stores augmentation data, such as overlays or filters, in an augmentation table 410. The augmentation data is associated with and applied to videos (for which data is stored in a video table 404) and images (for which data is stored in an image table 412).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 412 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 414 stores data regarding collections of messages and associated image, video, or audio data, which are compiled into a collection (e.g., a story or a gallery). The creation of a particular collection may be initiated by a particular user (e.g., each user for which a record is maintained in the entity table 406). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 404 stores video data that, in one example, is associated with messages for which records are maintained within the message table 402. Similarly, the image table 412 stores image data associated with messages for which message data is stored in the entity table 406. The entity table 406 may associate various augmentations from the augmentation table 410 with various images and videos stored in the image table 412 and the video table 404.

The database 126 can also store AR messages generated by the AR Messenger System 216.

Data Communications Architecture

Figure 5:
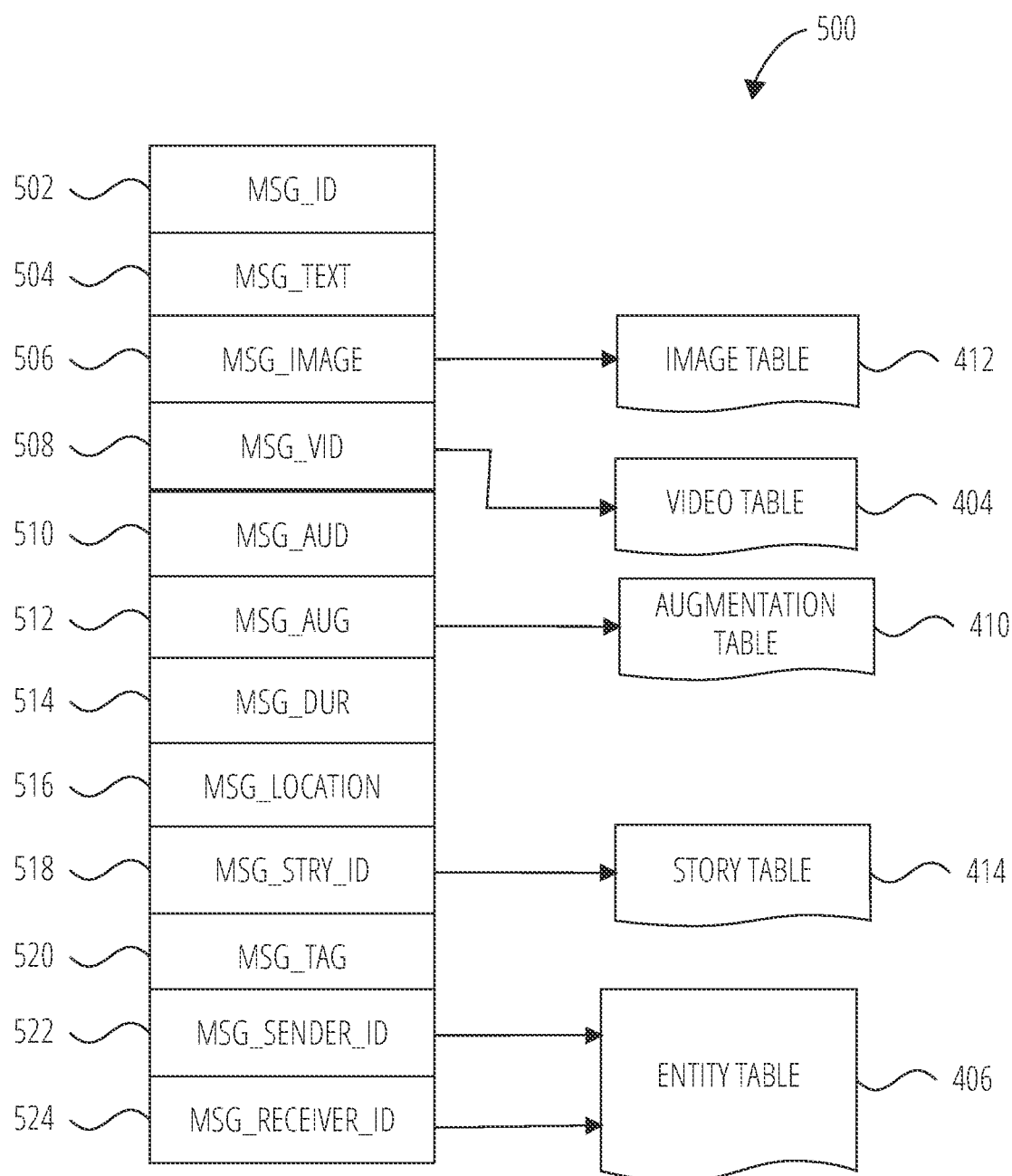
FIG. 5 is a diagrammatic representation of a message, in accordance with some examples.

FIG. 5 is a schematic diagram illustrating a structure of a message 500, according to some examples, generated by a messaging client 104 for communication to a further messaging client 104 or the messaging server 118. The content of a particular message 500 is used to populate the message table 402 stored within the database 126, accessible by the messaging server 118. Similarly, the content of a message 500 is stored in memory as "in-transit" or "in-flight" data of the client device 102 or the application servers 114. A message 500 is shown to include the following example components:

- message identifier 502: a unique identifier that identifies the message 500.
- message text payload 504: text, to be generated by a user via a user interface of the client device 102, and that is included in the message 500.
- message image payload 506: image data, captured by a camera component of a client device 102 or retrieved from a memory component of a client device 102, and that is included in the message 500. Image data for a sent or received message 500 may be stored in the image table 412.
- message video payload 508: video data, captured by a camera component or retrieved from a memory component of the client device 102, and that is included in the message 500. Video data for a sent or received message 500 may be stored in the video table 404.
- message audio payload 510: audio data, captured by a microphone or retrieved from a memory component of the client device 102, and that is included in the message 500.
- message augmentation data 512: augmentation data (e.g., filters, stickers, or other annotations or enhancements) that represents augmentations to be applied to message image payload 506, message video payload 508, or message audio payload 510 of the message 500. Augmentation data for a sent or received message 500 may be stored in the augmentation table 410.
- message duration parameter 514: parameter value indicating, in seconds, the amount of time for which content of the message (e.g., the message image payload 506, message video payload 508, message audio payload 510) is to be presented or made accessible to a user via the messaging client 104.
- message geolocation parameter 516: geolocation data (e.g., latitudinal and longitudinal coordinates) associated with the content payload of the message. Multiple message geolocation parameter 516 values may be included in the payload, each of these parameter values being associated with respect to content items included in the content (e.g., a specific image into within the message image payload 506, or a specific video in the message video payload 508).
- message story identifier 518: identifier values identifying one or more content collections (e.g., "stories" identified in the story table 414) with which a particular content item in the message image payload 506 of the message 500 is associated. For example, multiple images within the message image payload 506 may each be associated with multiple content collections using identifier values.
- message tag 520: each message 500 may be tagged with multiple tags, each of which is indicative of the subject matter of content included in the message payload. For example, where a particular image included in the message image payload 506 depicts an animal (e.g., a lion), a tag value may be included within the message tag 520 that is indicative of the relevant animal. Tag values may be generated manually, based on user input, or may be automatically generated using, for example, image recognition.
- message sender identifier 522: an identifier (e.g., a messaging system identifier, email address, or device identifier) indicative of a user of the Client device 102 on which the message 500 was generated and from which the message 500 was sent.
- message receiver identifier 524: an identifier (e.g., a messaging system identifier, email address, or device identifier) indicative of a user of the client device 102 to which the message 500 is addressed.

The contents (e.g., values) of the various components of message 500 may be pointers to locations in tables within which content data values are stored. For example, an image value in the message image payload 506 may be a pointer to (or address of) a location within an image table 412. Similarly, values within the message video payload 508 may point to data stored within a video table 404, values stored within the message augmentations may point to data stored in an augmentation table 410, values stored within the message story identifier 518 may point to data stored in a story table 414, and values stored within the message sender identifier 522 and the message receiver identifier 524 may point to user records stored within an entity table 406.

Time-Based Access Limitation Architecture

Figure 6:
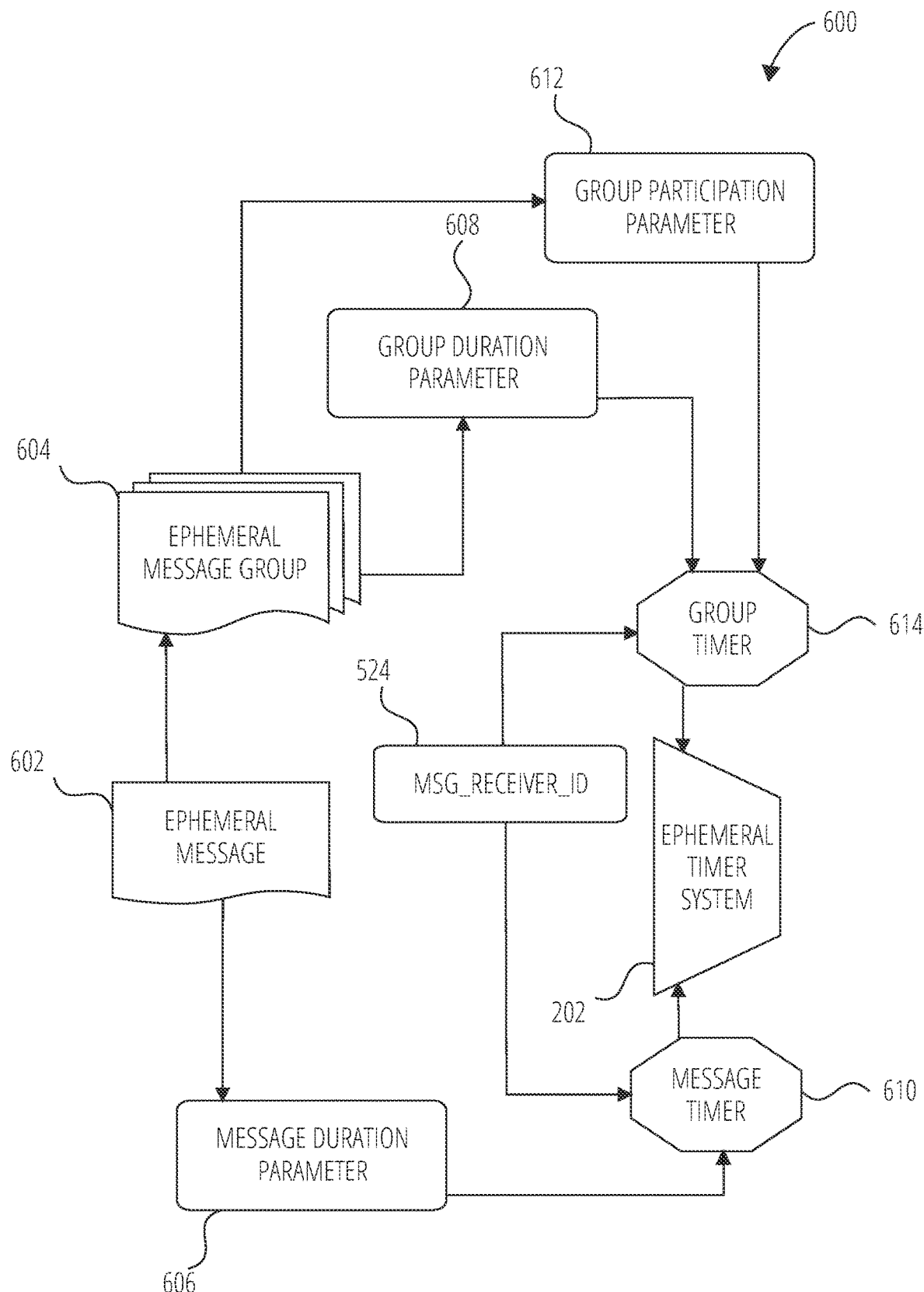
FIG. 6 is a flowchart for an access-limiting process, in accordance with some examples.

FIG. 6 is a schematic diagram illustrating an access-limiting process 600, in terms of which access to content (e.g., an ephemeral message 602, and associated multimedia payload of data) or a content collection (e.g., an ephemeral message group 604) may be time-limited (e.g., made ephemeral).

An ephemeral message 602 is shown to be associated with a message duration parameter 606, the value of which determines an amount of time that the ephemeral message 602 will be displayed to a receiving user of the ephemeral message 602 by the messaging client 104. In one example, an ephemeral message 602 is viewable by a receiving user for up to a maximum of 10 seconds, depending on the amount of time that the sending user specifies using the message duration parameter 606.

The message duration parameter 606 and the message receiver identifier 524 are shown to be inputs to a message timer 610, which is responsible for determining the amount of time that the ephemeral message 602 is shown to a particular receiving user identified by the message receiver identifier 524. In particular, the ephemeral message 602 will only be shown to the relevant receiving user for a time period determined by the value of the message duration parameter 606. The message timer 610 is shown to provide output to a more generalized ephemeral timer system 202, which is responsible for the overall timing of display of content (e.g., an ephemeral message 602) to a receiving user.

The ephemeral message 602 is shown in FIG. 6 to be included within an ephemeral message group 604 (e.g., a collection of messages in a personal story, or an event story). The ephemeral message group 604 has an associated group duration parameter 608, a value of which determines a time duration for which the ephemeral message group 604 is presented and accessible to users of the messaging system 100. The group duration parameter 608, for example, may be the duration of a music concert, where the ephemeral message group 604 is a collection of content pertaining to that concert. Alternatively, a user (either the owning user or a curator user) may specify the value for the group duration parameter 608 when performing the setup and creation of the ephemeral message group 604.

Additionally, each ephemeral message 602 within the ephemeral message group 604 has an associated group participation parameter 612, a value of which determines the duration of time for which the ephemeral message 602 will be accessible within the context of the ephemeral message group 604. Accordingly, a particular ephemeral message group 604 may "expire" and become inaccessible within the context of the ephemeral message group 604, prior to the ephemeral message group 604 itself expiring in terms of the group duration parameter 608. The group duration parameter 608, group participation parameter 612, and message receiver identifier 524 each provide input to a group timer 614, which operationally determines, firstly, whether a particular ephemeral message 602 of the ephemeral message group 604 will be displayed to a particular receiving user and, if so, for how long. Note that the ephemeral message group 604 is also aware of the identity of the particular receiving user as a result of the message receiver identifier 524.

Accordingly, the group timer 614 operationally controls the overall lifespan of an associated ephemeral message group 604, as well as an individual ephemeral message 602 included in the ephemeral message group 604. In one example, each and every ephemeral message 602 within the ephemeral message group 604 remains viewable and accessible for a time period specified by the group duration parameter 608. In a further example, a certain ephemeral message 602 may expire, within the context of ephemeral message group 604, based on a group participation parameter 612. Note that a message duration parameter 606 may still determine the duration of time for which a particular ephemeral message 602 is displayed to a receiving user, even within the context of the ephemeral message group 604. Accordingly, the message duration parameter 606 determines the duration of time that a particular ephemeral message 602 is displayed to a receiving user, regardless of whether the receiving user is viewing that ephemeral message 602 inside or outside the context of an ephemeral message group 604.

The ephemeral timer system 202 may furthermore operationally remove a particular ephemeral message 602 from the ephemeral message group 604 based on a determination that it has exceeded an associated group participation parameter 612. For example, when a sending user has established a group participation parameter 612 of 24 hours from posting, the ephemeral timer system 202 will remove the relevant ephemeral message 602 from the ephemeral message group 604 after the specified 24 hours. The ephemeral timer system 202 also operates to remove an ephemeral message group 604 when either the group participation parameter 612 for each and every ephemeral message 602 within the ephemeral message group 604 has expired, or when the ephemeral message group 604 itself has expired in terms of the group duration parameter 608.

In certain use cases, a creator of a particular ephemeral message group 604 may specify an indefinite group duration parameter 608. In this case, the expiration of the group participation parameter 612 for the last remaining ephemeral message 602 within the ephemeral message group 604 will determine when the ephemeral message group 604 itself expires. In this case, a new ephemeral message 602, added to the ephemeral message group 604, with a new group participation parameter 612, effectively extends the life of an ephemeral message group 604 to equal the value of the group participation parameter 612.

Responsive to the ephemeral timer system 202 determining that an ephemeral message group 604 has expired (e.g., is no longer accessible), the ephemeral timer system 202 communicates with the messaging system 100 (and, for example, specifically the messaging client 104) to cause an indicium (e.g., an icon) associated with the relevant ephemeral message group 604 to no longer be displayed within a user interface of the messaging client 104. Similarly, when the ephemeral timer system 202 determines that the message duration parameter 606 for a particular ephemeral message 602 has expired, the ephemeral timer system 202 causes the messaging client 104 to no longer display an indicium (e.g., an icon or textual identification) associated with the ephemeral message 602.

Figure 7:
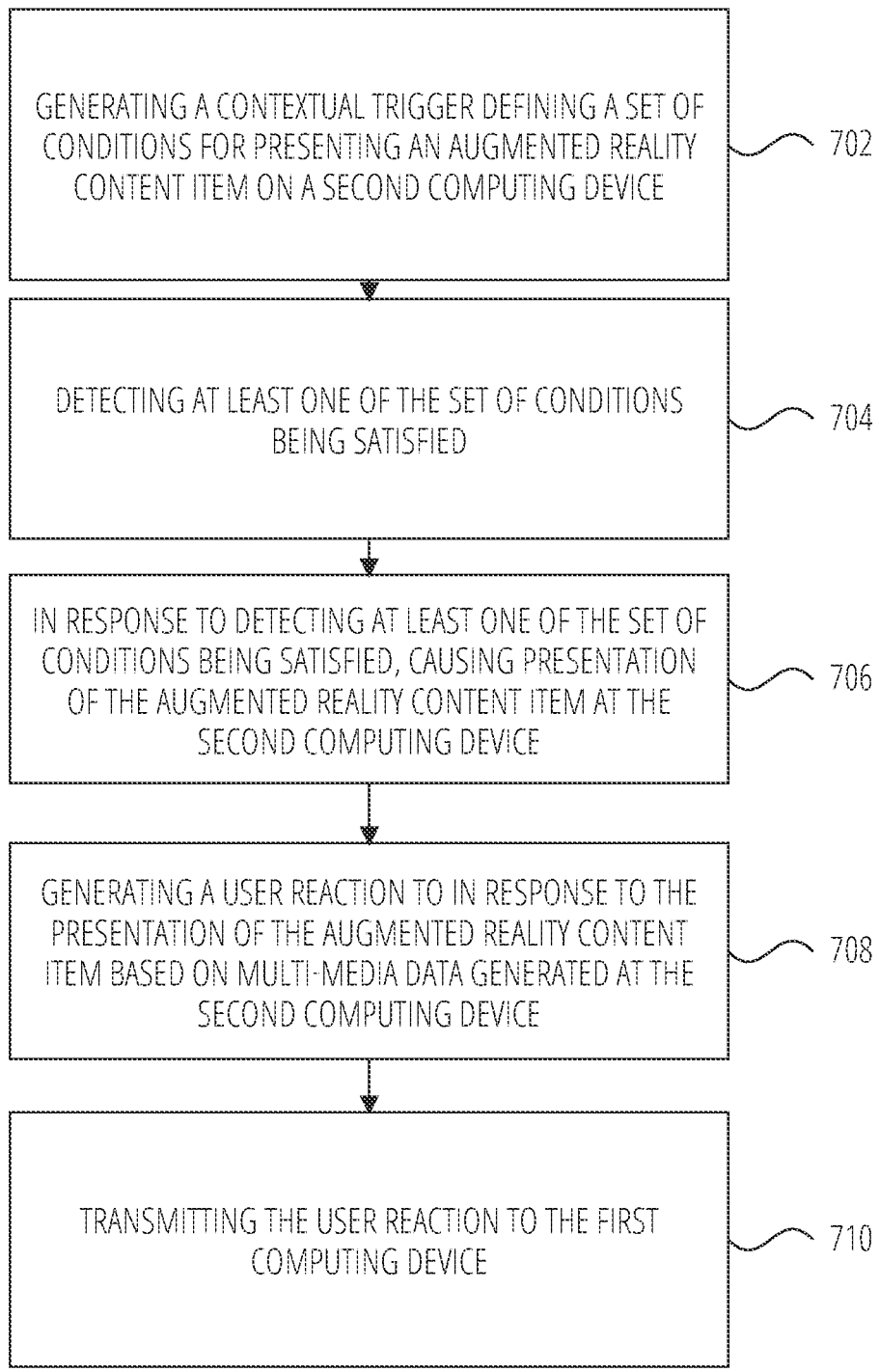
FIG. 7 is a flowchart for generating a context-based AR message, according to some example embodiments.

FIG. 7 is a flowchart of a method 700 for generating a context-based AR message, according to some example embodiments. The operations described below may be performed by the AR Messenger System 216. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In operation 702, the AR Messenger System 216 generates a contextual trigger defining a set of conditions for presenting an augmented reality content item on a second computing device. The contextual trigger may be generated at a first computing device. At operation 704, the AR Messenger System 216 detects at least one condition of the set of conditions being satisfied. In response to detecting at least one condition has been satisfied, the AR Messenger System causes presentation of the augmented reality content item at the second computing device. At operation 708 the AR messenger system 216 generates a user reaction in response to the presentation of the augmented reality content item based on multi-media data generated at the second computing device. The user reaction may include audio data. The user reaction may be a predefined length, such as ten seconds. However, it is understood that the generated reaction may be any suitable length of time. At operation 710 the AR messenger System 216 transmits the user reaction to the first computing device. In some examples, the user reaction is generated during presentation of the augmented reality content item at the second computing device. In some examples the augmented reality content item is overlaid on a field of view of a user of the second computing device.

The location trigger can be a physical address on a map, for example. In some examples the location trigger can be geographical coordinates (e.g., latitude and longitude), a general city (e.g., San Francisco), or an intersection of two streets. Once the AR glasses wearer is at the physical address or within a predefined threshold of the physical address, the AR message will be triggered. The time period trigger can be a time frame during which the AR message will be triggered. For example, a time frame may be 9:00 AM to 10:30 AM. The time frame can be associated with the time zone of the AR glasses wearer (e.g., the receiver of the AR message). In another example the time period trigger could be a specific time (e.g., 12:00 PM). The visual marker trigger can be an object that appears in the field of view of the AR glasses wearer. For example, the visual marker trigger may be a specific logo at the AR glasses wearer's workplace. Once the specific logo appears in the AR glasses wearer's field of view, the visual marker trigger condition is satisfied and the AR message is overlaid onto the AR glasses wearer's field of view. In some examples the visual marker trigger may be a specific color or texture.

In some examples, the AR Messenger System 216 captures, from the second computing device, a video. For example, the AR Messenger System 216, captures a video of the receiver's field of view. The AR Messenger System 216 determines that at least one condition of the set of conditions has been satisfied. In response to determining that at least one condition of the set of conditions has been satisfied, the AR Messenger System 216, modifies the video with the augmented reality content item during capture of the video. The AR Messenger System 216 captures the receiver's reaction to the modified video and transmits the receiver's reaction and the modified video to the first computing device.

The sender has the option of setting one or more triggers for the AR message via the graphical user interface of the first computing device. For example, the sender may set a location trigger. In order to determine that the location trigger has been satisfied, the AR Messenger System 216 identifies, using one or more sensors, a current location of the second computing device and determines that the current location of the second computing device matches the location trigger. In some examples, the sender may include a radius around the predefined physical address defined by the location trigger that satisfies the location trigger condition. For example, the sender may define the location trigger to include the physical address of the receiver's home and a one-mile radius surrounding their home. Thus, if the receiver is at their house, or within one mile of their house, the AR Messenger System 216 determines that the location trigger condition is satisfied.

If the sender sets the time period trigger, in order to determine that the time period trigger has been satisfied, the AR Messenger System 216 identifies a current time during capture of the video and determines that the current time falls within the time period trigger.

If the sender sets the visual marker trigger, in order to determine that the visual marker trigger has been satisfied, the AR Messenger System 216 identifies an object in the video during capture and determines that object matches the visual marker trigger.

The receiver has the option of sending their reaction back to the sender. For example, the AR Messenger System 216 may generate a user reaction. The AR Messenger System 216 causes presentation of a pop-up window on the graphical user interface of the second computing device. The graphical user interface may display visual cues representing an option for transmitting the user reaction with the modified video to the first computing device. For example, the visual cues may include a thumbs up indicating that the receiver wants to send their reaction, or a thumbs down, indicating that the receiver does not want to send their reaction. The AR Messenger System 216 detects the visual cue based on an analysis of image data generated by the first computing device. For example, the AR Messenger System 216 analyzes the pose of the receiver based on the image data generated by the receiver's device. If the AR Messenger System 216 identifies a thumbs up cue by the receiver (e.g., based on determining that the receiver is holding his or her thumb up based on image data captured using the receiver's computing device), the AR Messenger System 216 will transmit the receiver's reaction and the modified video to the first computing device. Thus, the receiver's pose (e.g., visual cue) confirms transmission of their user reaction. If the AR Messenger System 216 identifies a thumbs down cue, it will not transmit the receiver's reaction and the modified video to the first computing device. In some examples the visual cues may include a first graphic indicating that the receiver needs to say "Yes" to send their reaction, and a second graphic indicating that the receiver needs to say "No" to refrain from sending their reaction. In some examples, the receiver's reaction is recorded as an audio file. In some examples, the receiver may send only their reaction back to the sender without sending the modified video.

FIG. 8 is an illustration of an AR message, according to some example embodiments. While the AR Messenger System 216 allows users to interact natively with AR message content instead of viewing AR message content as part of a photo or a video. Item 802 is a view of a message thread between two users. In response to opening a message 808, the user is shown the contents of the message 804. The contents of the message 804 include AR message content. The user may be an AR glasses wearer and view the AR message content on the AR glasses as shown in item 806.

Figure 9:
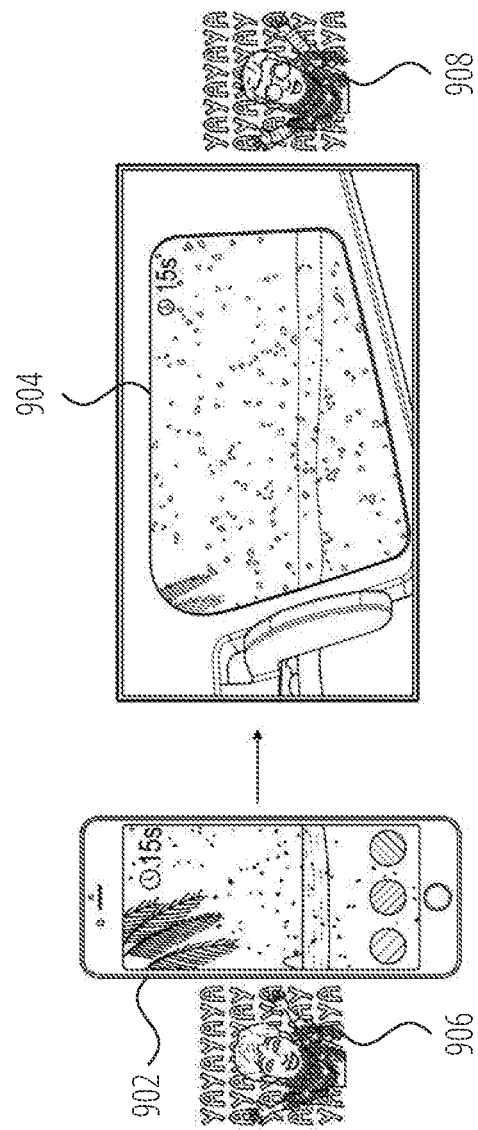
FIG. 9 is an illustration of an augmented reality message, according to some example embodiments.

FIG. 9 is an illustration of an AR message, according to some example embodiments. In some examples, the AR Messenger System 216 allows for a sender 906 of an AR message to see what the AR glasses wearer is seeing (as shown in item 902) on a computing device of the sender 906. For example, a sender can see that the wearer is on the beach during the winter and is missing out on a snowy day. The sender can generate an AR message with falling snow and send it to the wearer. The wearer's 908 reality is augmented by the falling snow as shown in item 904.

Figure 10A:
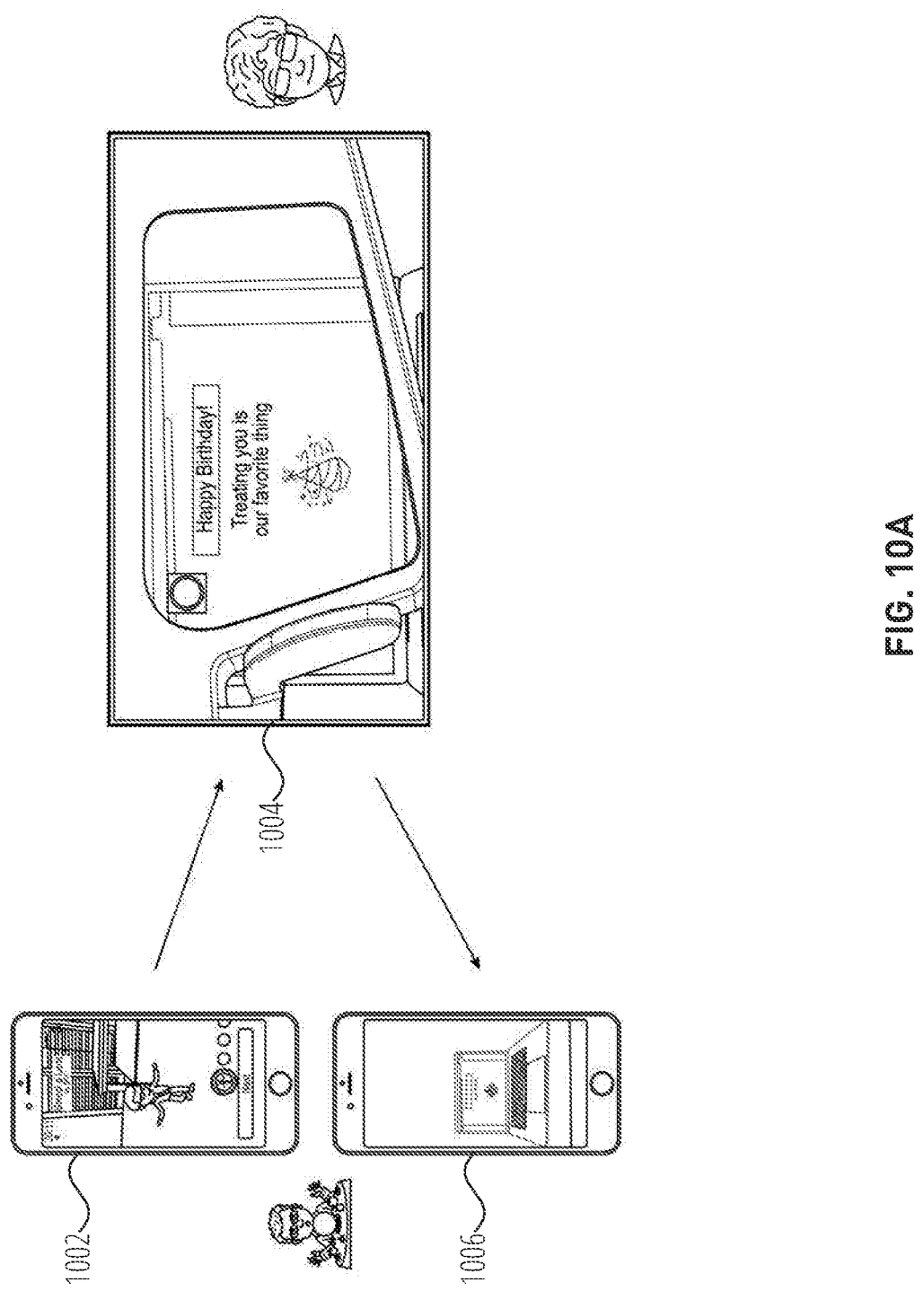
FIGS. 10A, 10B, and 10C are illustrations of an AR messenger system, according to some example embodiments.
Figure 10B:
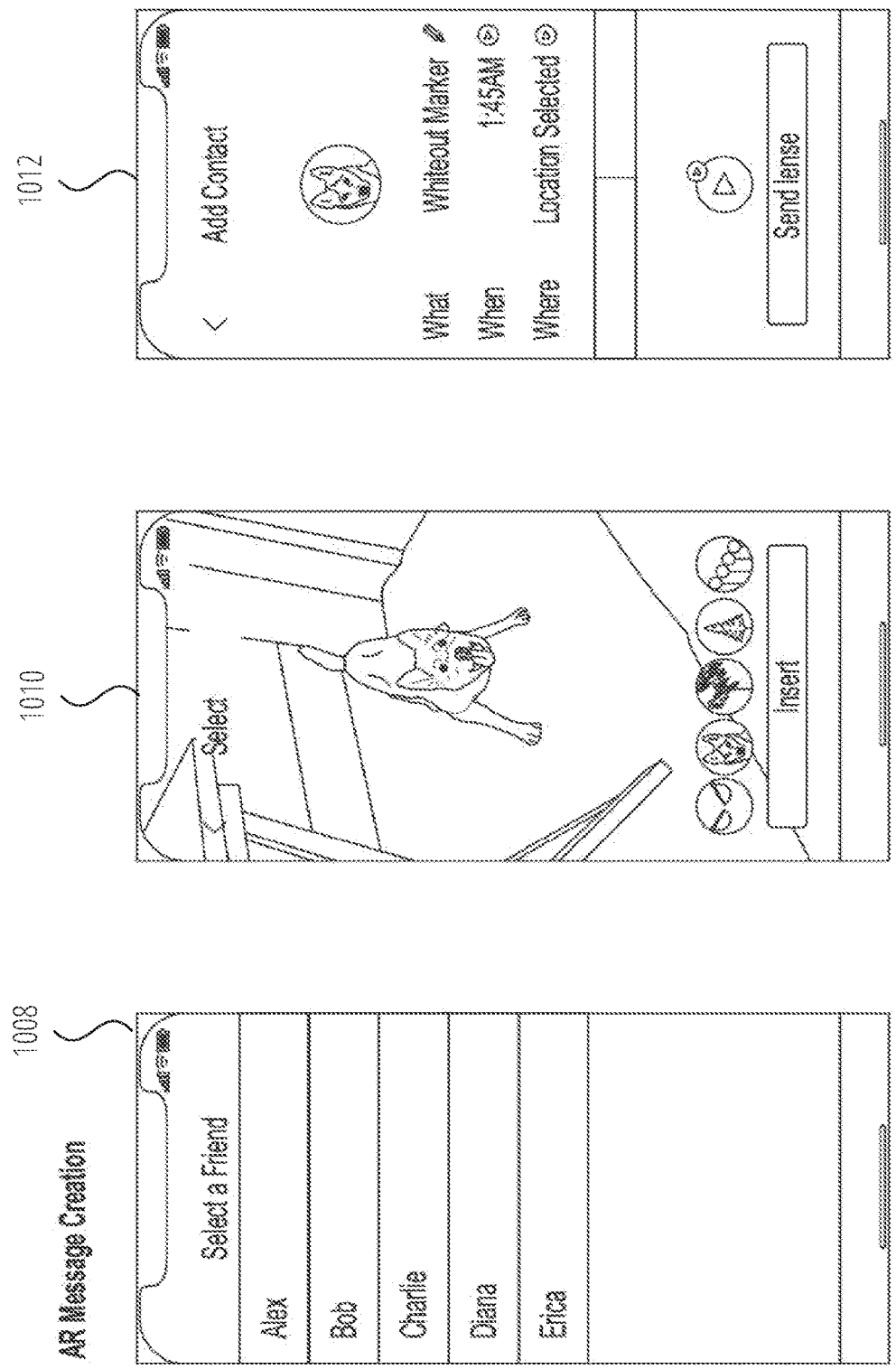
Figure 10C:
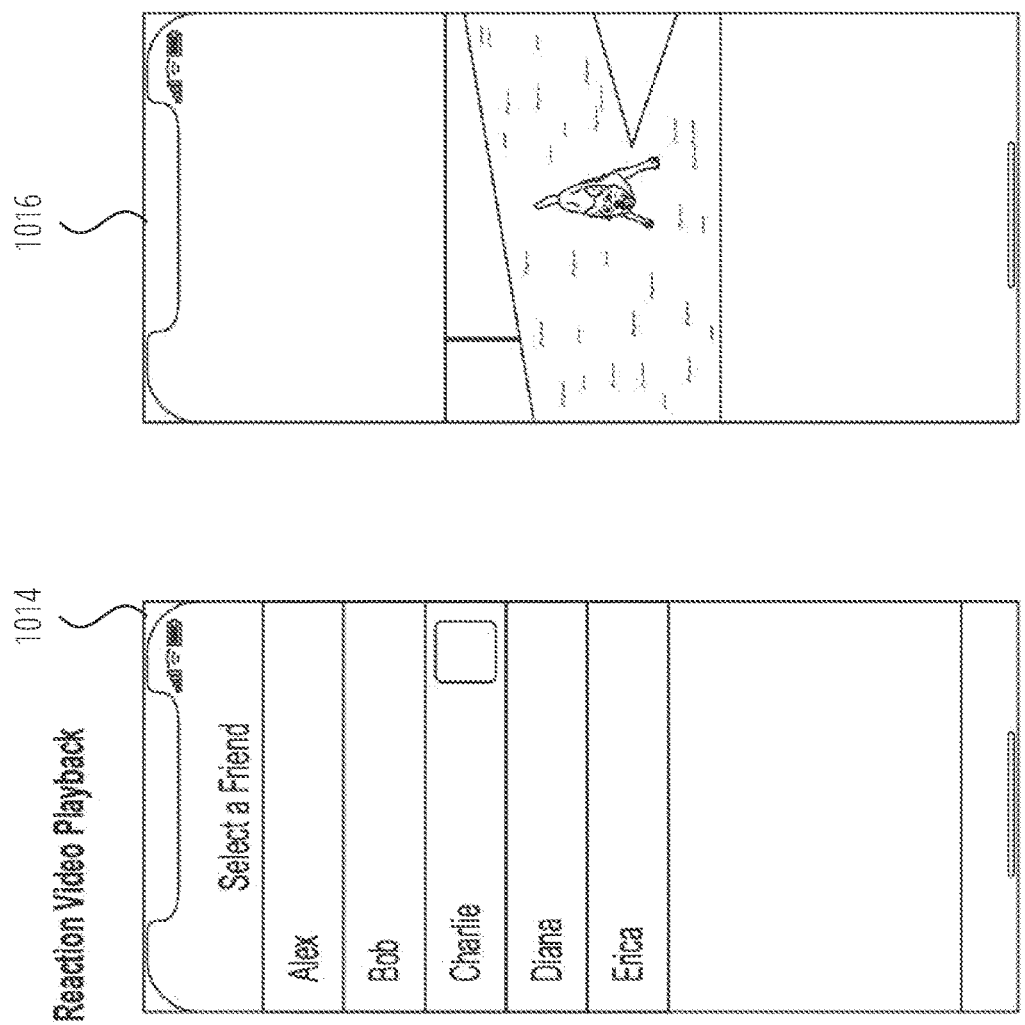

FIGS. 10A-10C are illustrations of an AR messenger system, according to some example embodiments. At item 1002, the AR message sender, sends a condition-based AR message. At item 1004, the AR message is triggered. For example, at least one condition of the predefined conditions (e.g., time period trigger, location trigger, visual marker trigger) is matched. At item 1006, the AR glasses wearer reacts to the AR message and sends their reaction back to the sender.

Item 1008 represents a user interface displayed on the first computing device of the sender. The user interface of 1008 is used to select a friend to send a generated an AR message.

Item 1010 is a user interface that is used to select a lens for the AR message. The lens may include AR message content, such as an AR depiction of a dog, as shown in item 1010. Item 1012 is a user interface that is used to set the preferences of the AR message. The sender may select various conditions such as whether the AR message is initiated upon a marker image, a specific time frame for displaying the AR message, and a specific location required for displaying the message.

Item 1012 represents a user interface displayed on the first computing device of the sender. For example, after the receiver views the AR message and captures his reaction, he may send the modified video and his reaction back to the sender. The sender may view the modified video as shown in item 1016, and reaction on a graphical user interface of the first computing device.

FIGS. 11-18 illustrate operation of the AR messenger system, according to some example embodiments. The sender, Caleb, is using the AR Messenger System 216 to enhance Steve's, the AR glasses wearer, birthday experience. Since the sender and receiver are close friends, the sender is able to use the AR Messenger System 216 to provide context-based AR messages that further enhance the receiver's birthday experience.

FIGS. 11-14 illustrate a visual marker trigger-based AR message, according to some example embodiments. In FIG. 11 the receiver 1104 enters the micro-kitchen in his office and sees the poster 1102. The sender knows that the receiver starts his day off by getting a cup of coffee in the office micro-kitchen and designates the poster 1102 as the visual marker trigger. In FIG. 12, once the AR Messenger System 216 identifies the poster 1102 as the visual marker trigger 1202, the receiver's 1204 glasses flash. In FIG. 13, in response to the visual marker trigger, the AR Messenger System 216 overlays AR birthday candles 1302 onto the receiver's 1304 AR glasses. The receiver audibly reacts 1304 to the AR message and in FIG. 14, the AR Messenger System 216, displays a pop window 1402 with voice cues giving the receiver the option to send his reaction back to the sender. If the receiver says 'Yes,' the AR Messenger System 216, will send his reaction back to the sender, and if the receiver says 'NO' the AR Messenger System 216, will not send the reaction back to the sender.

FIGS. 15-18 illustrate a time period trigger and location trigger-based AR message, according to some example embodiments. In FIG. 15 the receiver 1504 is leaving his office and walking back home. The sender knows that the receiver ends his workday between 6:00 PM EST to 8:00 PM EST every night. The sender also knows the physical location of the receiver's home and sets a location trigger to include the physical address of the receiver's home and a 0.5-mile radius around the receiver's home. In FIG. 16, the AR Messenger System 216 identifies that the timer period trigger and the location trigger have both been satisfied and the receiver's 1604 glasses flash 1602. In FIG. 17, the AR Messenger System 216 overlays AR fireworks 1702 in the receiver's 1704 field of view. The receiver audibly reacts 1704 and in FIG. 18, the AR Messenger System 216, displays a pop window 1802 with voice cues giving the receiver 1804 the option to send his reaction back to the sender. If the receiver says 'Yes,' the AR Messenger System 216, will send his reaction back to the sender, and if the receiver says 'NO' the AR Messenger System 216, will not send the reaction back to the sender.

Figure 19:
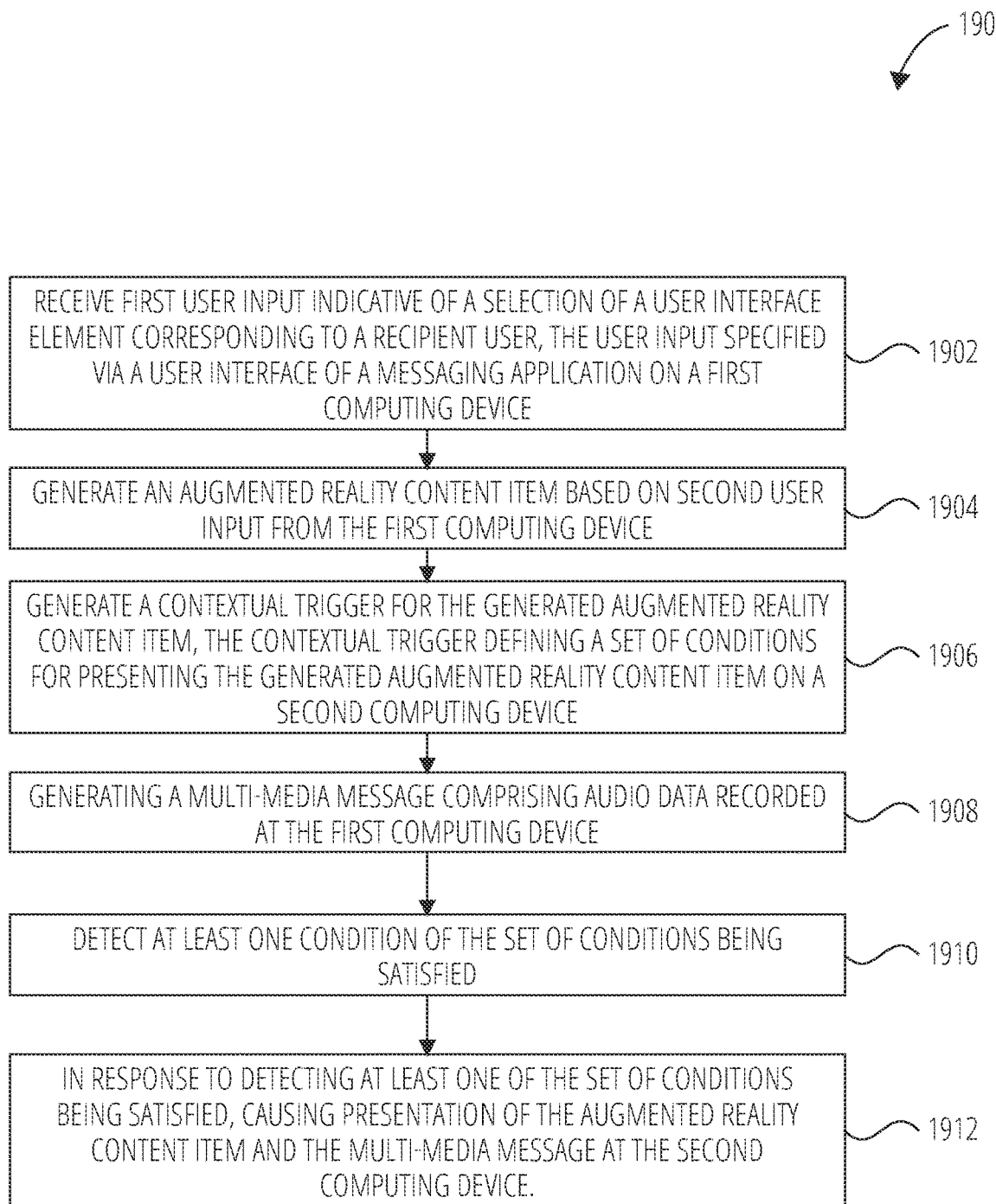
FIG. 19. is a flowchart for generating a context-triggered AR message, according to some example embodiments.
Figure 20:
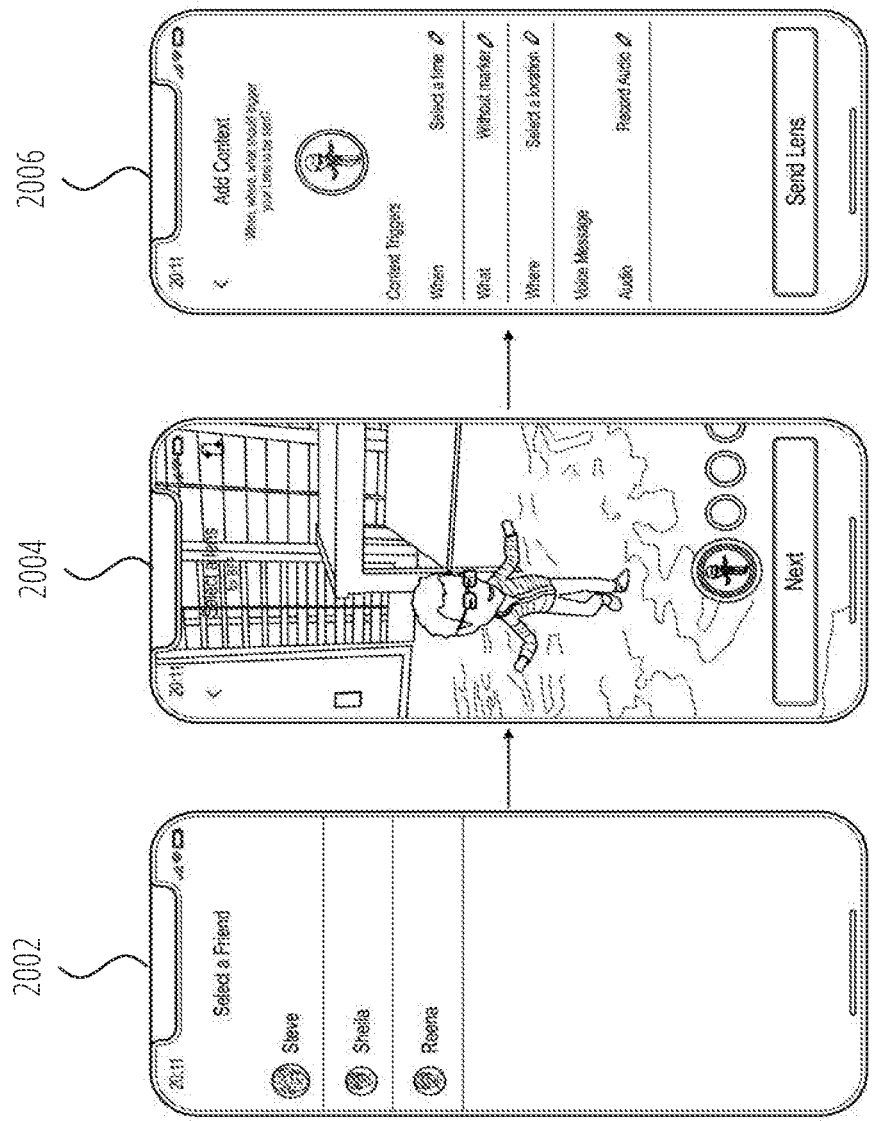
FIG. 20 illustrates a user interface for generating a context triggered AR message.
Figure 21:
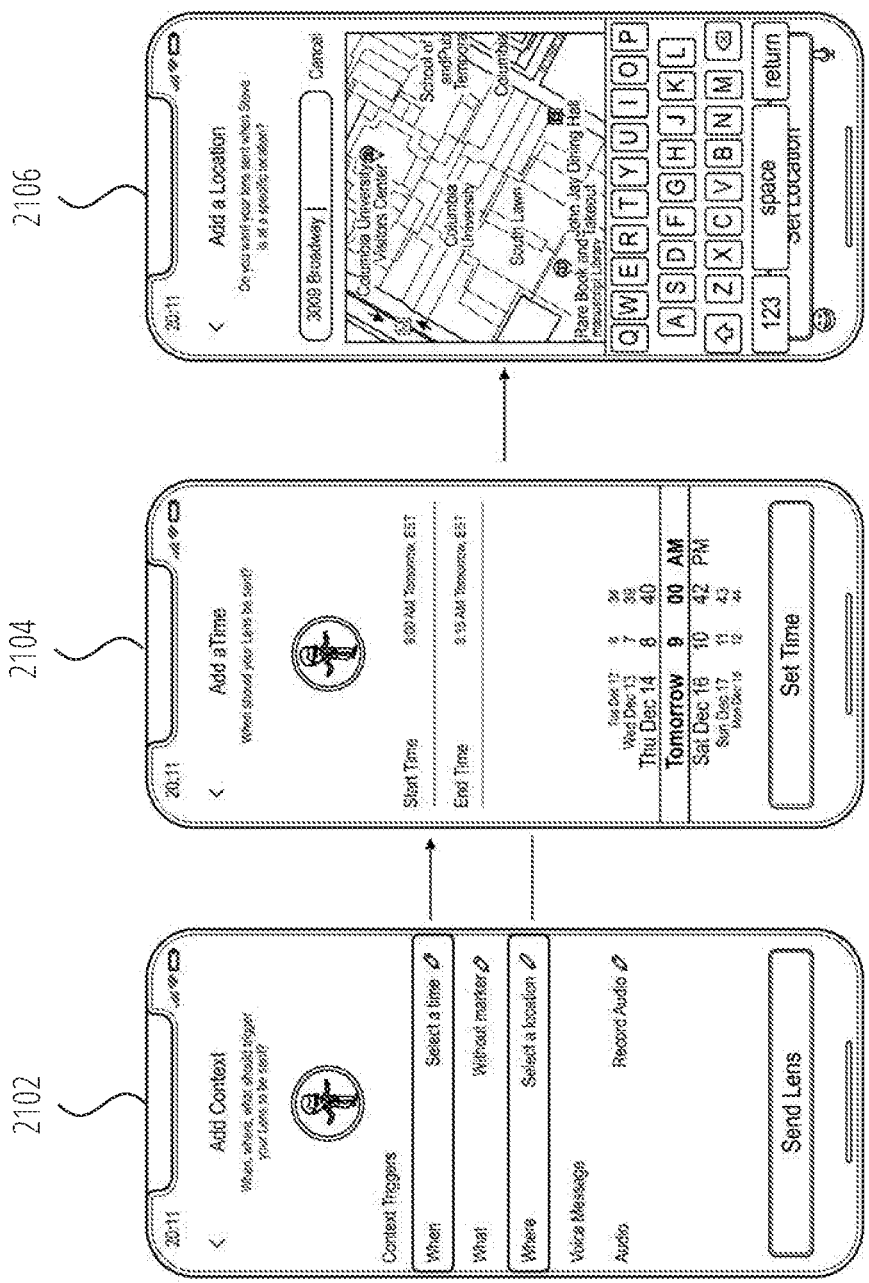
FIG. 21 illustrates a user interface for generating a context triggered AR message.
Figure 22:
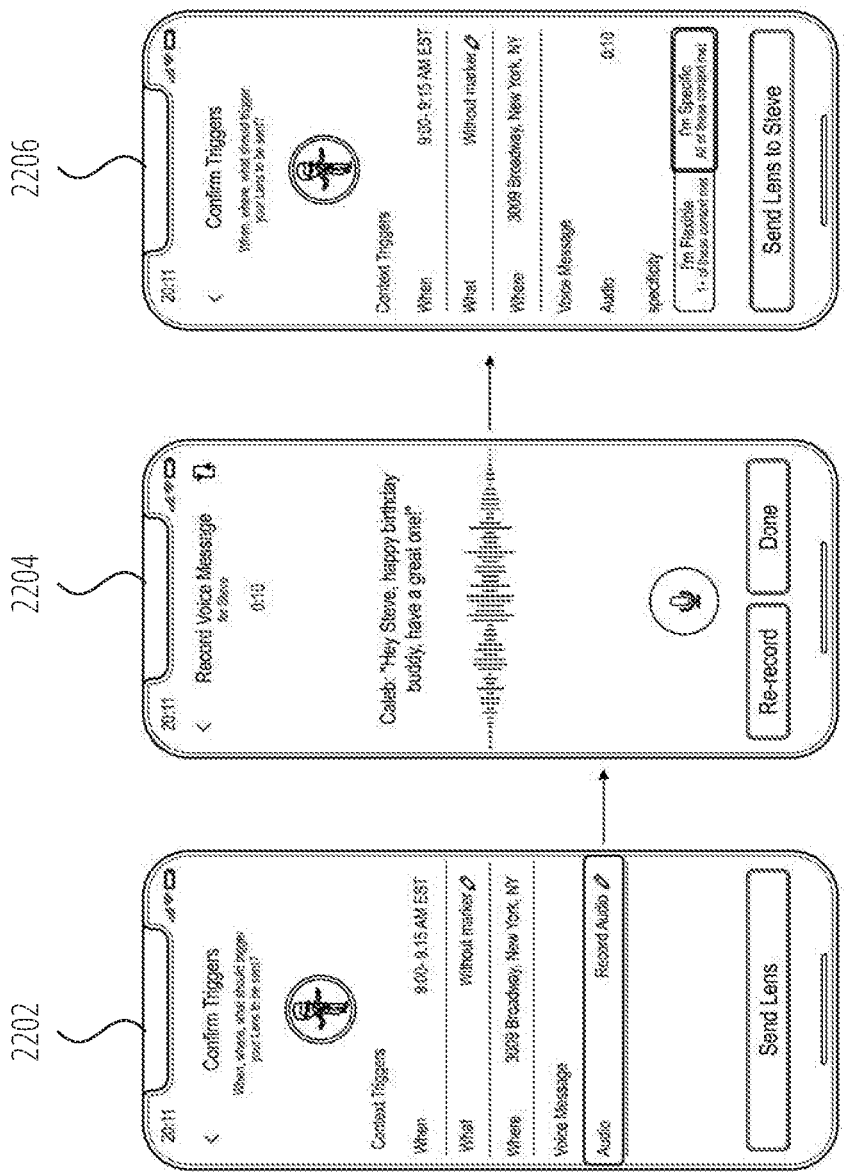
FIG. 22 illustrates a user interface for generating a context triggered AR message.
Figure 23:
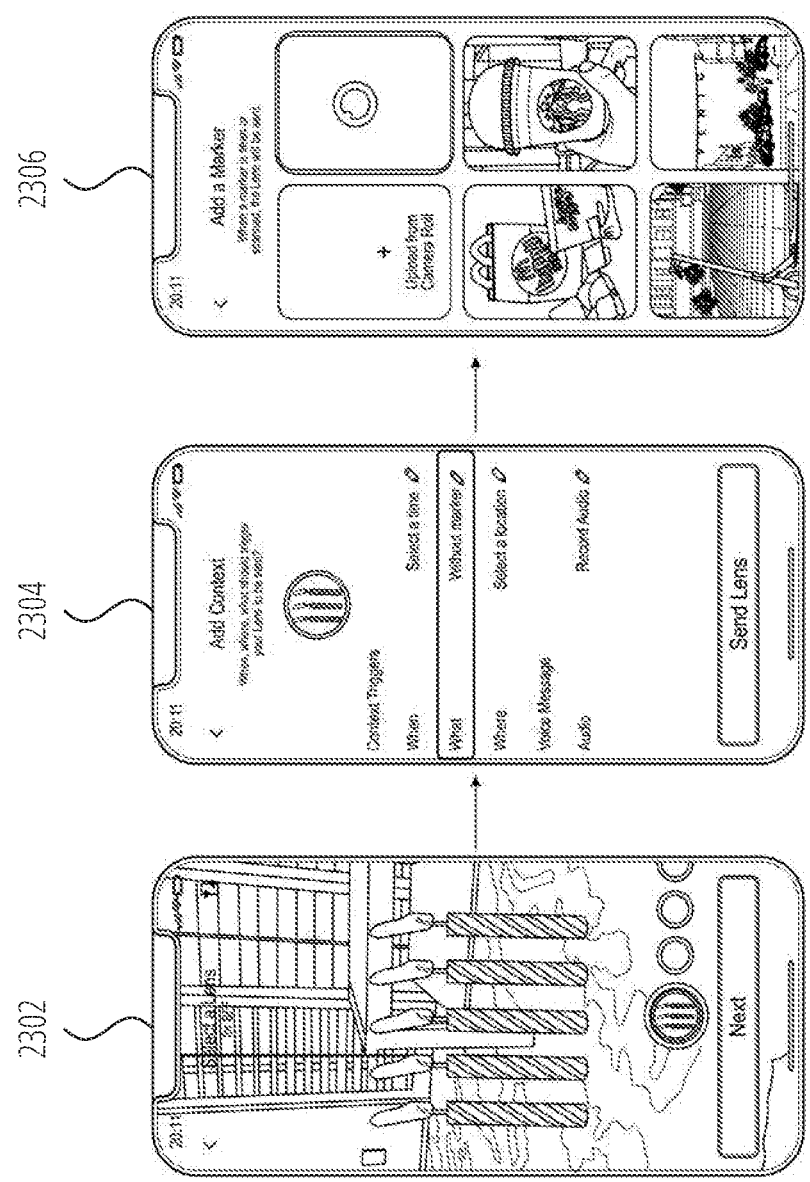
FIG. 23 illustrates a user interface for generating a context triggered AR message.
Figure 24:
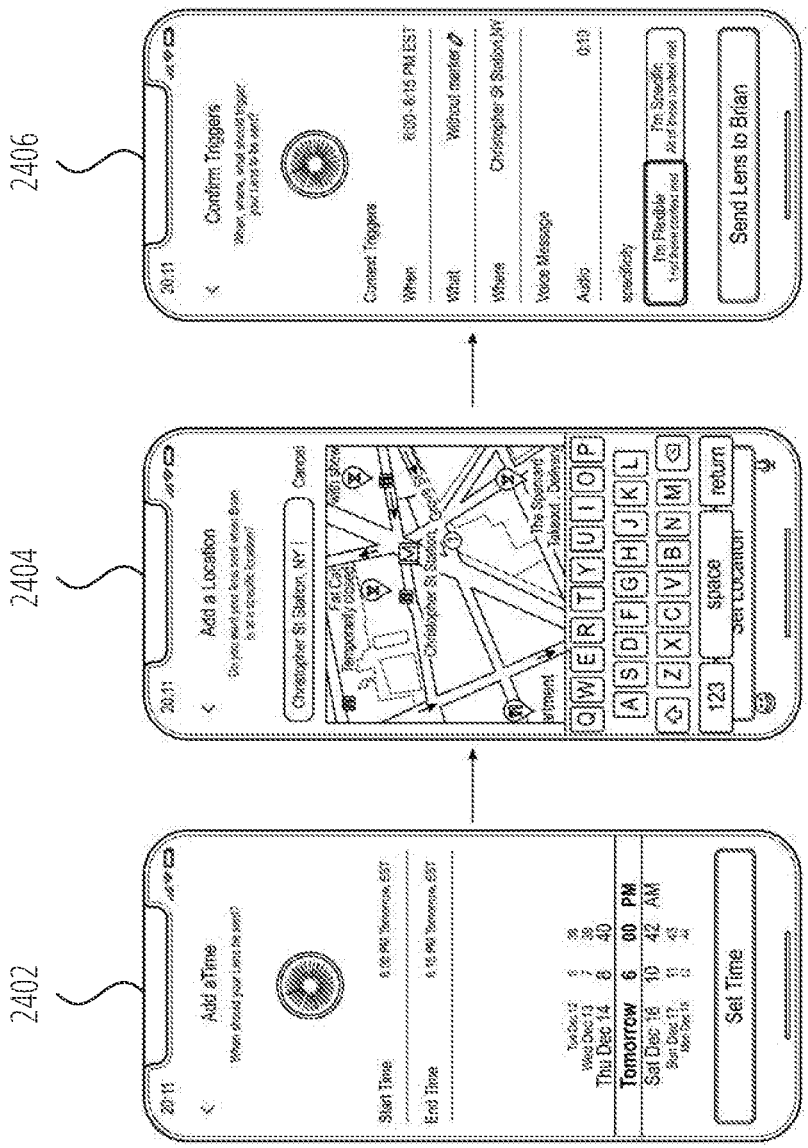
FIG. 24 illustrates a user interface for generating a context triggered AR message.

FIG. 19 is a flowchart of a method 1900 for generating a context-based AR message, according to some example embodiments. The operations described below may be performed by the AR Messenger System 216. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

At operation 1902, the AR Messenger System 216 receives first user input indicative of a selection of a user interface element corresponding to a recipient user. The user input may be specified via a user interface of a messaging application on a first computing device. For example, the sender may select a button corresponding to the receiver. At operation 1904, the AR Messenger System 216 generates an augmented reality content item based on second user input from the first computing device. The augmented reality content item may be the augmented reality content items discussed above in relation to FIG. 4. The sender of the AR message (e.g., the user of the first computing device) can access an augmented reality content item to send as part of the AR message. In another example, the sender can generate a specific augmented reality content item via the graphical user interface of the first computing device.

At operation 1906, the AR Messenger System 216 generates a contextual trigger for the generated augmented reality content item. The contextual trigger defines a set of conditions for presenting the generated augmented reality content item on a second computing device. In some examples, the contextual trigger is generated based on user input specified via a graphical user interface of the first computing device. In some examples, the first computing device is a smartphone and the second computing device is a pair of AR glasses described in FIG. 3.

At operation 1908, The AR Messenger System 216 generates a multi-media message comprising audio data recorded at the first computing device. For example, the AR Messenger System 216 may use one or more sensors of the first computing device to record an audio message. At operation 1910, the AR Messenger System 216 detects at least one condition of the set of conditions being satisfied. At operation 1912, in response to detecting at least one of the set of conditions being satisfied, the AR Messenger System 216 causes presentation of the augmented reality content item and the multi-media message at the second computing device. For example, the receiver may be using a second computing device (e.g., AR Glasses) with which they may view their surroundings through an eye piece. The augmented reality content item and multi-media message is overlaid on their field of view. The AR Messenger System 216 may record a video of the augmented reality content item and multi-media message overlaid on the receiver's field of view The sender has the option of setting one or more triggers for the AR message via the graphical user interface of the first computing device. For example, the sender may set a location trigger. In order to determine that the location trigger has been satisfied, the AR Messenger System 216 identifies, using one or more sensors, a current location of the second computing device and determines that the current location of the second computing device matches the location trigger. In some examples, the sender may include a radius around the predefined physical address defined by the location trigger that satisfies the location trigger condition. For example, the sender may define the location trigger to include the physical address of the receiver's home and a one-mile radius surrounding their home. Thus, if the receiver is at their house, or within one mile of their house, the AR Messenger System 216 determines that the location trigger condition is satisfied. In some examples the location trigger is associated with a location category trigger. For example, the location trigger set by the sender may include a category of "restaurants." If the receiver is near any location that is categorized as a restaurant, the location trigger is satisfied. The sender may define the location category trigger via the graphical user interface of the first computing device. The AR Messenger System 216 identifies, using one or more sensors, a location category associated with the current location of the second computing device and determines that the location category associated with the current location matches the location category trigger.

If the sender sets the time period trigger, in order to determine that the time period trigger has been satisfied, the AR Messenger System 216 identifies a current time during capture of the video and determines that the current time falls within the time period trigger.

If the sender sets the visual marker trigger, in order to determine that the visual marker trigger has been satisfied, the AR Messenger System 216 identifies an object in the video during capture and determines that object matches the visual marker trigger. The visual marker trigger may be associated with a marker category trigger. For example, the visual marker trigger set by the sender may include a category of "Mona Lisa Paintings." If the receiver sees a Mona Lisa painting in his or her field of view, the visual marker trigger is satisfied.

In some examples, the AR Messenger System 216 determines a probability that the at least one condition of the set of conditions will be satisfied and presents a display element representing the probability on the graphical user interface of the first computing device. For example, while the sender is setting up the contextual triggers, the AR Messenger System 216 may calculate the probability that the contextual triggers will indeed be triggered by the receiver. If the sender sets more flexible location, time and visual marker triggers, the probability that contextual triggers will be triggered is higher. If the sender sets a more restrictive location, time or visual marker trigger, the probability is lower. In some examples, the display element is updated in real-time as the sender generates each condition of the contextual triggers. The display element may be a meter graphic with an arrow which includes a green portion on one end, a yellow portion in the middle and a red portion on the opposite end. A higher probability may be represented by the arrow pointing at the green portion. A lower probability may be represented by the arrow point at the red portion. Although described as using a meter graphic, it is understood that any suitable graphic representing a range of probabilities may be used.

In some examples, while generating the contextual triggers, the AR Messenger System 216 receives a selection of a user interface element defining a level of specificity for the contextual trigger. For example, the sender may select a toggle button from the first computing device which defines how flexible or rigid the sender wants to be with the conditions for triggering the AR message. Based on the selection, the AR Messenger System 216 identifies a minimum number of conditions that must be detected in order to trigger the AR message and modify the video on the second computing device. For example, if the sender selects a "Flexible" option on the toggle button, the AR Messenger System 216 may identify at least one condition that must be met in order to trigger the AR message. If the sender selects a "Specific" option on the toggle button, the AR Messenger System 216 may identify a minimum of three conditions that must be met in order to trigger the AR message.

While generating the contextual triggers, the AR Messenger System 216 may access data from the second computing device to further provide a more tailored AR experience for the receiving user. For example, the AR Messenger System 216 may access calendar data or a camera roll on the second computing device. The accessed data (e.g., calendar data or images on the camera roll) may be used to define at least one condition of the set of conditions. For example, the sender may access the receiver's calendar data to determine where the receiver will be going that day and at what time he will be going there. Thus, the sender can use the receiver's calendar data to define the location trigger and time trigger. In another example, the sender may access the receiver's camera roll to determine what items in the receiver's home looks like. The sender may view a photo of the receiver's refrigerator and use that as a visual marker trigger. Thus, when the receiver sees his refrigerator in his field of view with the second computing device, an AR message will be triggered. In some examples, the AR Messenger System 216 may need to validate access privileges for the first computing device, in order to access data from the second computing device.

FIGS. 20-24 are illustrations of user interfaces within an AR messaging system, according to some example embodiments. At item 2002, the sender, via the graphical user interface of the first computing device may select a recipient to send an AR message. At item 2004, the sender can generate an augmented content reality item to send as part of the AR message. At item 2006, the sender creates contextual triggers for the AR message. At item 2006, the sender can further create an audio message to the selected recipient.

At item 2102, the sender may select two conditions for the AR message: When (e.g., time period trigger) and Where (e.g., location trigger). At item 2104, the sender may generate a time period trigger for the AR message by setting a Start Time and an End Time using user interface elements. At item 2106, the sender may set the location trigger my inputting a physical address.

At item 2202, the sender may select the option to record an audio message. At item 2204, the sender may record an audio message. The sender may re-record the message or select the recorded message to send to the recipient. At item 2206, the sender may select the level of granularity of the contextual triggers using a toggle interface element. For example, the sender may select the "I'm Specific" option to indicate that all conditions for the contextual trigger must be satisfied in order for the AR message to be triggered.

At item 2302, the sender may generate a subsequent AR message and selects a subsequent augmented reality content item. At item 2304, the sender may opt in to use a visual marker trigger. At item 2306, the sender may select a visual marker to be used as the visual marker trigger. In some examples, the sender may upload an image from the first computing device to use as the visual marker trigger.

At item 2402, the sender may generate a time period trigger for the AR message and item 2404, the sender may generate a location trigger by inputting a physical address. At item 2406, the sender may select the level of granularity of the contextual triggers using a toggle interface element. For example, the sender may select the "I'm Flexible" option to indicate that at least one condition for the contextual trigger must be satisfied in order for the AR message to be triggered.

Machine Architecture

Figure 25:
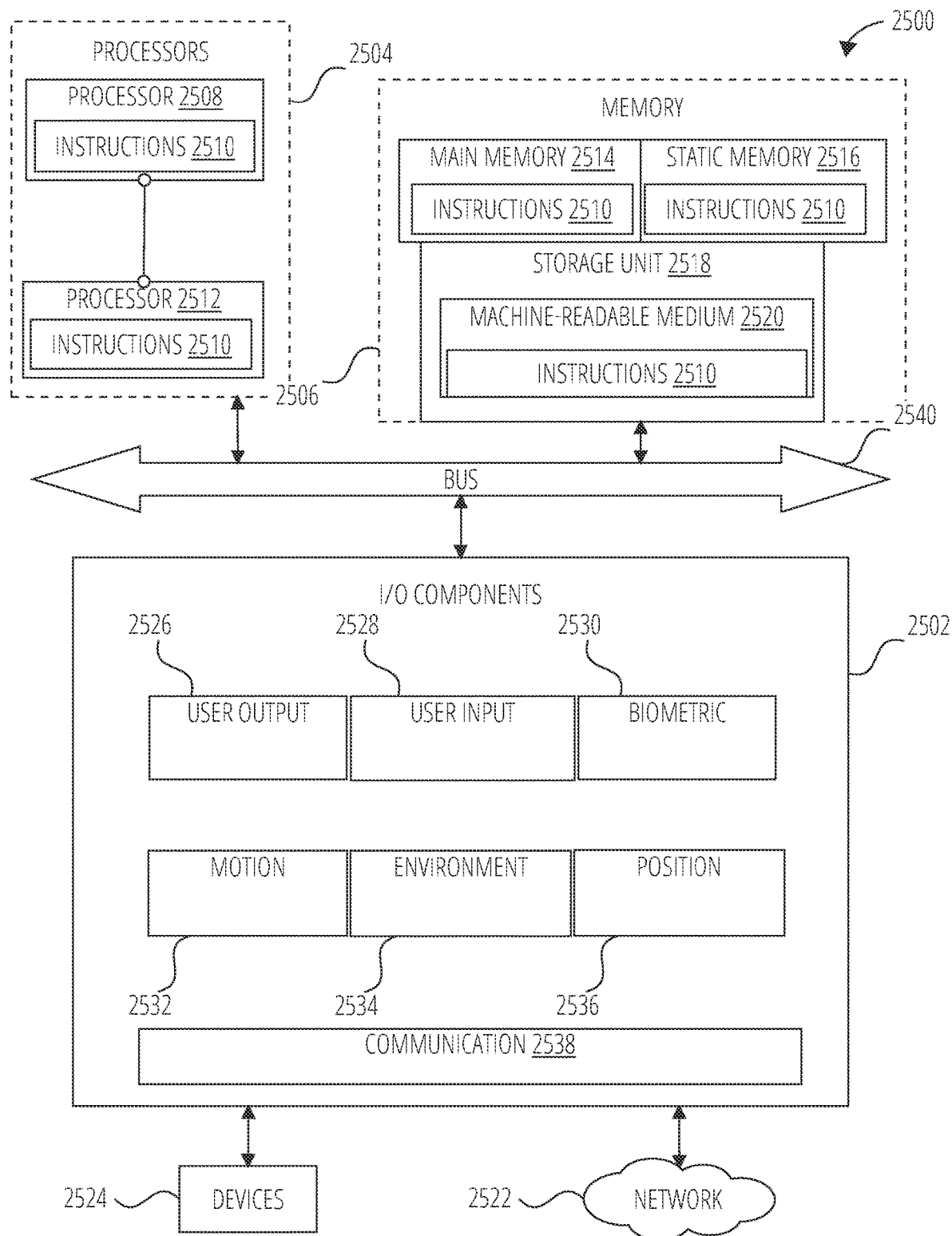
FIG. 25 is a diagrammatic representation of a machine in the form of a computer system within which a set of instructions may be executed for causing the machine to perform any one or more of the methodologies discussed herein, in accordance with some examples.

FIG. 25 is a diagrammatic representation of the machine 2500 within which instructions 2510 (e.g., software, a program, an application, an applet, an app, or other executable code) for causing the machine 2500 to perform any one or more of the methodologies discussed herein may be executed. For example, the instructions 2510 may cause the machine 2500 to execute any one or more of the methods described herein. The instructions 2510 transform the general, non-programmed machine 2500 into a particular machine 2500 programmed to carry out the described and illustrated functions in the manner described. The machine 2500 may operate as a standalone device or may be coupled (e.g., networked) to other machines. In a networked deployment, the machine 2500 may operate in the capacity of a server machine or a client machine in a server-client network environment, or as a peer machine in a peer-to-peer (or distributed) network environment. The machine 2500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2510, sequentially or otherwise, that specify actions to be taken by the machine 2500. Further, while only a single machine 2500 is illustrated, the term "machine" shall also be taken to include a collection of machines that individually or jointly execute the instructions 2510 to perform any one or more of the methodologies discussed herein. The machine 2500, for example, may comprise the client device 102 (deleted) or any one of a number of server devices forming part of the messaging server system 108 (deleted). In some examples, the machine 2500 may also comprise both client and server systems, with certain operations of a particular method or algorithm being performed on the server-side and with certain operations of the particular method or algorithm being performed on the client-side.

The machine 2500 may include processors 2504, memory 2506, and input/output I/O components 2502, which may be configured to communicate with each other via a bus 2540. In an example, the processors 2504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2508 and a processor 2512 that execute the instructions 2510. The term "processor" is intended to include multi-core processors that may comprise two or more independent processors (sometimes referred to as "cores") that may execute instructions contemporaneously. Although FIG. 25 shows multiple processors 2504, the machine 2500 may include a single processor with a single-core, a single processor with multiple cores (e.g., a multi-core processor), multiple processors with a single core, multiple processors with multiples cores, or any combination thereof.

The memory 2506 includes a main memory 2514, a static memory 2516, and a storage unit 2518, both accessible to the processors 2504 via the bus 2540. The main memory 2506, the static memory 2516, and storage unit 2518 store the instructions 2510 embodying any one or more of the methodologies or functions described herein. The instructions 2510 may also reside, completely or partially, within the main memory 2514, within the static memory 2516, within machine-readable medium 2520 within the storage unit 2518, within at least one of the processors 2504 (e.g., within the Processor's cache memory), or any suitable combination thereof, during execution thereof by the machine 2500.

The I/O components 2502 may include a wide variety of components to receive input, provide output, produce output, transmit information, exchange information, capture measurements, and so on. The specific I/O components 2502 that are included in a particular machine will depend on the type of machine. For example, portable machines such as mobile phones may include a touch input device or other such input mechanisms, while a headless server machine will likely not include such a touch input device. It will be appreciated that the I/O components 2502 may include many other components that are not shown in FIG. 25. In various examples, the I/O components 2502 may include user output components 2526 and user input components 2528. The user output components 2526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2502 may include biometric components 2530, motion components 2532, environmental components 2534, or position components 2536, among a wide array of other components. For example, the biometric components 2530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2532 include acceleration sensor components (e.g., accelerometer), gravitation sensor components, rotation sensor components (e.g., gyroscope).

The environmental components 2534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 (deleted) may have a camera system comprising, for example, front cameras on a front surface of the client device 102 (deleted) and rear cameras on a rear surface of the client device 102 (deleted). The front cameras may, for example, be used to capture still images and video of a user of the client device 102 (deleted) (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 (deleted) may also include a 360° camera for capturing 360° photographs and videos.

Further, the camera system of a client device 102 (deleted) may include dual rear cameras (e.g., a primary camera as well as a depth-sensing camera), or even triple, quad or penta rear camera configurations on the front and rear sides of the client device 102 (deleted). These multiple cameras systems may include a wide camera, an ultra-wide camera, a telephoto camera, a macro camera and a depth sensor, for example.

The position components 2536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2502 further include communication components 2538 operable to couple the machine 2500 to a network 2522 or devices 2524 via respective coupling or connections. For example, the communication components 2538 may include a network interface Component or another suitable device to interface with the network 2522. In further examples, the communication components 2538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2524 may be another machine or any of a wide variety of peripheral devices (e.g., a peripheral device coupled via a USB).

Moreover, the communication components 2538 may detect identifiers or include components operable to detect identifiers. For example, the communication components 2538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2538, such as location via Internet Protocol (IP) geolocation, location via Wi-Fi® signal triangulation, location via detecting an NFC beacon signal that may indicate a particular location, and so forth.

The various memories (e.g., main memory 2514, static memory 2516, and memory of the processors 2504) and storage unit 2518 may store one or more sets of instructions and data structures (e.g., software) embodying or used by any one or more of the methodologies or functions described herein. These instructions (e.g., the instructions 2510), when executed by processors 2504, cause various operations to implement the disclosed examples.

The instructions 2510 may be transmitted or received over the network 2522, using a transmission medium, via a network interface device (e.g., a network interface component included in the communication components 2538) and using any one of several well-known transfer protocols (e.g., hypertext transfer protocol (HTTP)). Similarly, the instructions 2510 may be transmitted or received using a transmission medium via a coupling (e.g., a peer-to-peer coupling) to the devices 2524.

Software Architecture

Figure 26:
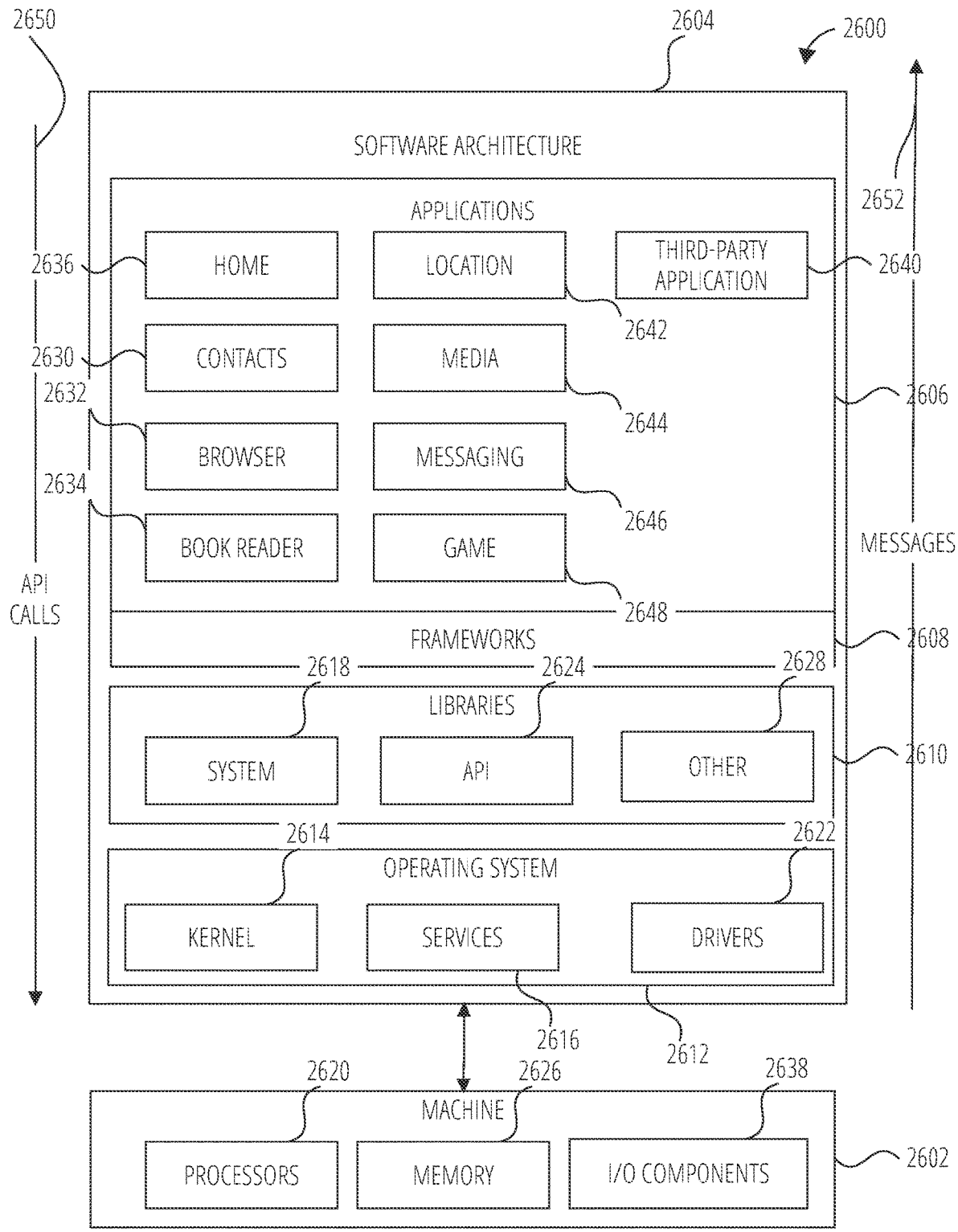
FIG. 26 is a block diagram showing a software architecture within which examples may be implemented.

FIG. 26 is a block diagram 2600 illustrating a software architecture 2604, which can be installed on any one or more of the devices described herein. The software architecture 2604 is supported by hardware such as a machine 2602 that includes processors 2620, memory 2626, and I/O components 2638. In this example, the software architecture 2604 can be conceptualized as a stack of layers, where each layer provides a particular functionality. The software architecture 2604 includes layers such as an operating system 2612, libraries 2610, frameworks 2608, and applications 2606. Operationally, the applications 2606 invoke API calls 2650 through the software stack and receive messages 2652 in response to the API calls 2650.

The operating system 2612 manages hardware resources and provides common services. The operating system 2612 includes, for example, a kernel 2614, services 2616, and drivers 2622. The kernel 2614 acts as an abstraction layer between the hardware and the other software layers. For example, the kernel 2614 provides memory management, processor management (e.g., scheduling), component management, networking, and security settings, among other functionality. The services 2616 can provide other common services for the other software layers. The drivers 2622 are responsible for controlling or interfacing with the underlying hardware. For instance, the drivers 2622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2610 provide a common low-level infrastructure used by the applications 2606. The libraries 2610 can include system libraries 2618 (e.g., C standard library) that provide functions such as memory allocation functions, string manipulation functions, mathematic functions, and the like. In addition, the libraries 2610 can include API libraries 2624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2610 can also include a wide variety of other libraries 2628 to provide many other APIs to the applications 2606.

The frameworks 2608 provide a common high-level infrastructure that is used by the applications 2606. For example, the frameworks 2608 provide various graphical user interface (GUI) functions, high-level resource management, and high-level location services. The frameworks 2608 can provide a broad spectrum of other APIs that can be used by the applications 2606, some of which may be specific to a particular operating system or platform.

In an example, the applications 2606 may include a home application 2636, a contacts application 2630, a browser application 2632, a book reader application 2634, a location application 2642, a media application 2644, a messaging application 2646, a game application 2648, and a broad assortment of other applications such as a third-party application 2640. The applications 2606 are programs that execute functions defined in the programs. Various programming languages can be employed to create one or more of the applications 2606, structured in a variety of manners, such as object-oriented programming languages (e.g., Objective-C, Java, or C++) or procedural programming languages (e.g., C or assembly language). In a specific example, the third-party application 2640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2640 can invoke the API calls 2650 provided by the operating system 2612 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices, magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   providing, to a first computing device, access to a set of images stored on a second computing device;
   receiving, from the first computing device, a selection of an object depicted in an image of the set of images stored on the second computing device;
   receiving, from the first computing device, a contextual trigger defining a set of conditions for presenting an augmented reality content item on the second computing device, the set of conditions comprising a visual marker trigger to cause presentation of the augmented reality content item in response to the object, that has been selected in the image of the set of images stored on the second computing device, being depicted in a field of view of a user of the second computing device;

receiving, from the first computing device, a level of specificity of the contextual trigger, the level of specificity indicating a minimum number of conditions in the set of conditions that must be satisfied to present the augmented reality content item;

determining a probability that the minimum number of conditions in the set of conditions will be satisfied based on the level of specificity;

in response to determining the probability, causing display of a meter graphic on a graphical user interface of the first computing device, the meter graphic comprising a graphical representation of the probability;

receiving an indication from the second computing device that the minimum number of conditions of the set of conditions has been satisfied;

causing presentation of the augmented reality content item at the second computing device based on the minimum number of conditions of the set of conditions being satisfied, the augmented reality content item being presented in response to the field of view of the user of the second computing device depicting the object that has been selected in the image of the set of images stored on the second computing device;

receiving, by the second computing device, a user reaction to the augmented reality content item based on multi-media data generated at the second computing device; and transmitting to the first computing device, the user reaction and the presented augmented reality content item overlaid on the field of view of the user of the second computing device.

2. The method of claim 1, wherein the user reaction is generated during presentation of the augmented reality content item at the second computing device.

3. The method of claim 1, wherein the set of conditions further comprise one or more of a time period trigger or a location trigger.

4. The method of claim 3, wherein the location trigger comprises a location address on a map.

5. The method of claim 3, wherein receiving the indication that the minimum number of conditions of the set of conditions has been satisfied further comprises:
identifying a current location of the second computing device; and
determining that the current location of the second computing device matches the location trigger.

6. The method of claim 3, wherein receiving the indication that the minimum number of conditions of the set of conditions has been satisfied further comprises:
identifying, a current time; and
determining that the current time falls within the time period trigger.

7. The method of claim 3, wherein receiving the indication that the minimum number of conditions of the set of conditions has been satisfied further comprises:
identifying the object in image data; and
determining that the object in the image data matches the object depicted in the image of the set of images.

8. The method of claim 1, wherein generating the user reaction further comprises:
causing presentation, at the second computing device, of a pop-up window comprising a visual cue representing an option for transmitting the user reaction to the first computing device;

detecting the visual cue based on an analysis of image data generated at the first computing device, the visual cue confirming transmission of the user reaction; and in response to the detecting the visual cue, transmitting the user reaction to the first computing device.

9. A system comprising:
one or more processors; and
a processor-readable storage device coupled to the one or more processors, the processor-readable storage device storing processor-executable instructions that, when executed by the one or more processors, cause the one or more processors to perform operations comprising:
providing, to a first computing device, access to a set of images stored on a second computing device;
receiving, from the first computing device, a selection of an object depicted in an image of the set of images stored on the second computing device;
receiving, from the first computing device, a contextual trigger defining a set of conditions for presenting an augmented reality content item on the second computing device, the set of conditions comprising a visual marker trigger to cause presentation of the augmented reality content item in response to the object, that has been selected in the image of the set of images stored on the second computing device, being depicted in a field of view of a user of the second computing device;
receiving, from the first computing device, a level of specificity of the contextual trigger, the level of specificity indicating a minimum number of conditions in the set of conditions that must be satisfied to present the augmented reality content item;
determining a probability that the minimum number of conditions in the set of conditions will be satisfied based on the level of specificity;
in response to determining the probability, causing display of a meter graphic on a graphical user interface of the first computing device, the meter graphic comprising a graphical representation of the probability;
receiving an indication from the second computing device that the minimum number of conditions of the set of conditions has been satisfied;
causing presentation of the augmented reality content item at the second computing device based on the minimum number of conditions of the set of conditions being satisfied, the augmented reality content item being presented in response to the field of view of the user of the second computing device depicting the object that has been selected in the image of the set of images stored on the second computing device;
receiving, by the second computing device, a user reaction to the augmented reality content item based on multi-media data generated at the second computing device; and
transmitting to the first computing device, the user reaction and the presented augmented reality content item overlaid on the field of view of the user of the second computing device.

10. The system of claim 9, wherein the user reaction is generated during presentation of the augmented reality content item at the second computing device.

11. The system of claim 9, wherein the set of conditions further comprise one or more of a time period trigger or a location trigger.

12. The system of claim 11, wherein the location trigger comprises a location address on a map.

13. The system of claim 11, wherein receiving the indication that the minimum number of conditions of the set of conditions has been satisfied further comprises:
   identifying a current location of the second computing device; and
   determining that the current location of the second computing device matches the location trigger.

14. The system of claim 11, wherein receiving the indication that the minimum number of conditions of the set of conditions has been satisfied further comprises:
   identifying, a current time; and
   determining that the current time falls within the time period trigger.

15. The system of claim 11, wherein receiving the indication that the minimum number of conditions of the set of conditions has been satisfied further comprises:
   identifying the object in image data; and
   determining that the object in the image data matches the object depicted in the image of the set of images.

16. A non-transitory processor-readable storage medium storing processor executable instructions that, when executed by one or more processors of a machine, cause the machine to perform operations comprising:
   providing, to a first computing device, access to a set of images stored on a second computing device;
   receiving, from the first computing device, a selection of an object depicted in an image of the set of images stored on the second computing device;
   receiving, from the first computing device, a contextual trigger defining a set of conditions for presenting an augmented reality content item on the second computing device, the set of conditions comprising a visual marker trigger to cause presentation of the augmented reality content item in response to the object, that has been selected in the image of the set of images stored on the second computing device, being depicted in a field of view of a user of the second computing device;
   receiving, from the first computing device, a level of specificity of the contextual trigger, the level of specificity indicating a minimum number of conditions in the set of conditions that must be satisfied to present the augmented reality content item;
   determining a probability that the minimum number of conditions in the set of conditions will be satisfied based on the level of specificity;
   in response to determining the probability, causing display of a meter graphic on a graphical user interface of the first computing device, the meter graphic comprising a graphical representation of the probability;
   receiving an indication from the second computing device that the minimum number of conditions of the set of conditions has been satisfied;
   causing presentation of the augmented reality content item at the second computing device based on the minimum number of conditions of the set of conditions being satisfied, the augmented reality content item being presented in response to the field of view of the user of the second computing device depicting the object that has been selected in the image of the set of images stored on the second computing device;
   receiving, by the second computing device, a user reaction to the augmented reality content item based on multi-media data generated at the second computing device; and
   transmitting to the first computing device, the user reaction and the presented augmented reality content item overlaid on the field of view of the user of the second computing device.

17. The non-transitory processor-readable storage medium of claim 16, wherein the user reaction is generated during presentation of the augmented reality content item at the second computing device.

18. The method of claim 1, wherein the level of specificity is received in response to a selection of a user interface element at the first computing device.

19. The method of claim 3, wherein the time period trigger is based on calendar data stored on the second computing device.

20. The method of claim 3, wherein the location trigger is based on calendar data stored on the second computing device.

* * * * *